(12) United States Patent
Witchey

(10) Patent No.: US 10,434,451 B2
(45) Date of Patent: Oct. 8, 2019

(54) APPARATUS AND METHOD OF HARVESTING AIRBORNE MOISTURE

(71) Applicant: Nant Holdings IP, LLC, Culver City, CA (US)

(72) Inventor: Nicholas J. Witchey, Laguna Hills, CA (US)

(73) Assignee: NANT HOLDINGS IP, LLC, Culver City, CA (US)

( * ) Notice: Subject to any disclaimer, the term of this patent is extended or adjusted under 35 U.S.C. 154(b) by 250 days.

(21) Appl. No.: 15/660,585

(22) Filed: Jul. 26, 2017

(65) Prior Publication Data

US 2019/0030475 A1     Jan. 31, 2019

(51) Int. Cl.

| | |
|---|---|
| *G06N 7/00* | (2006.01) |
| *B01D 46/00* | (2006.01) |
| *H04B 7/185* | (2006.01) |
| *B64C 39/02* | (2006.01) |
| *B64D 47/08* | (2006.01) |
| *B64B 1/40* | (2006.01) |

(Continued)

(52) U.S. Cl.
CPC ....... *B01D 46/0031* (2013.01); *B01D 53/265* (2013.01); *B64B 1/40* (2013.01); *B64C 39/024* (2013.01); *B64D 1/22* (2013.01); *B64D 47/08* (2013.01); *E03B 3/28* (2013.01); *G06K 9/0063* (2013.01); *G06K 9/4604* (2013.01); *G06K 9/52* (2013.01); *H04B 7/18502* (2013.01); *B01D 46/02* (2013.01); *B64C 2201/022* (2013.01); *B64C 2201/024* (2013.01); *B64C 2201/12* (2013.01)

(58) Field of Classification Search
USPC .................................................. 1/1; 701/26
See application file for complete search history.

(56) References Cited

U.S. PATENT DOCUMENTS

| | | | |
|---|---|---|---|
| 3,318,107 | A | 5/1967 | Riley et al. |
| 3,616,615 | A | 11/1971 | Woodbury |

(Continued)

FOREIGN PATENT DOCUMENTS

| | | |
|---|---|---|
| CN | 203890299 | 10/2014 |
| WO | 2016015943 | 2/2016 |

OTHER PUBLICATIONS

Park, Kyoo-Chul et al., "Optimal Design of Permeable Fiber Network Structures for Fog harvesting," Langmuir, 2013, 29 (43) Oct. 2013, pp. 13269-13277.

*Primary Examiner* — Masud Ahmed
(74) *Attorney, Agent, or Firm* — Stetina Brunda Garred and Brucker

(57) ABSTRACT

An apparatus for use in harvesting airborne moisture includes an unmanned aerial vehicle (UAV), a woven mesh, supported by the UAV, for collecting liquid droplets upon contact with a fog bank, a camera, a processor, a non-transitory, tangible computer readable memory storing software instructions executable by the processor, a fog identification engine, and a flight controller on board the UAV. The fog identification engine is executable on the processor according to the software instructions and is configurable to capture a digital image via the camera, detect an absence of features in the digital image, and identify a fog bank as a function of the absence of features in the digital image. The flight controller directs the UAV to enter a fog bank identified by the fog identification engine.

19 Claims, 12 Drawing Sheets

(51) Int. Cl.
  *B64D 1/22*   (2006.01)
  *B01D 53/26*  (2006.01)
  *G06K 9/00*   (2006.01)
  *G06K 9/46*   (2006.01)
  *E03B 3/28*   (2006.01)
  *G06K 9/52*   (2006.01)
  *B01D 46/02*  (2006.01)

(56) References Cited

U.S. PATENT DOCUMENTS

| | | | |
|---|---|---|---|
| 4,651,010 | A | 3/1987 | Javan |
| 5,233,843 | A | 8/1993 | Clarke |
| 7,842,625 | B1 | 11/2010 | Stockton et al. |
| 8,718,410 | B2 | 5/2014 | Boncyk et al. |
| 9,412,176 | B2 | 8/2016 | Song et al. |
| 9,460,366 | B2 | 10/2016 | Wnuk et al. |
| 9,466,009 | B2 | 10/2016 | Jaber et al. |
| 9,508,009 | B2 | 11/2016 | Wnuk et al. |
| 9,547,678 | B2 | 1/2017 | Wnuk et al. |
| 9,558,426 | B2 | 1/2017 | Song et al. |
| 9,563,201 | B1 * | 2/2017 | Tofte ................ G05D 1/0038 |
| 10,102,589 | B1 * | 10/2018 | Tofte ................ G06Q 40/08 |
| 2014/0190352 | A1 * | 7/2014 | Park ................ B01D 39/083 |
| | | | 95/285 |
| 2014/0236388 | A1 | 8/2014 | Wong et al. |
| 2015/0049939 | A1 | 2/2015 | Siddiqui |
| 2015/0161474 | A1 | 6/2015 | Jaber et al. |
| 2015/0254510 | A1 | 9/2015 | McKinnon et al. |
| 2015/0261803 | A1 | 9/2015 | Song et al. |
| 2015/0262036 | A1 | 9/2015 | Song et al. |
| 2015/0278224 | A1 | 10/2015 | Jaber et al. |
| 2015/0294188 | A1 | 10/2015 | Wnuk et al. |
| 2015/0310306 | A1 | 10/2015 | Song et al. |
| 2015/0356482 | A1 | 12/2015 | Whipple et al. |
| 2015/0363644 | A1 | 12/2015 | Wnuk et al. |
| 2016/0012597 | A1 | 1/2016 | Wnuk |
| 2016/0063642 | A1 * | 3/2016 | Luciani ............. G06Q 40/08 |
| | | | 705/4 |
| 2016/0259815 | A1 | 9/2016 | Song et al. |
| 2016/0259816 | A1 | 9/2016 | Song |
| 2016/0275353 | A1 | 9/2016 | Wnuk et al. |
| 2017/0161627 | A1 * | 6/2017 | Xu ................ G06N 7/005 |
| 2017/0323235 | A1 * | 11/2017 | Johnston ......... G06Q 10/06311 |
| 2018/0292826 | A1 * | 10/2018 | DeFelice ............ G05D 1/0088 |

\* cited by examiner

```
MONITOR
SURROUNDINGS      ── 810
      │
      ▼
IDENTIFY FOG BANK  ── 820
      │
      ▼
MANEUVER TO
LOCATION          ── 830
      │
      ▼
DETERMINE
VISIBILITY        ── 840
      │
      ▼
UTILIZE NON VISUAL
GUIDANCE          ── 850
      │
      ▼
DETECT INCREASED
WEIGHT OF MESH    ── 860
      │
      ▼
DELIVER LIQUID
DROPLETS          ── 870
```

FIG. 8

APPARATUS AND METHOD OF HARVESTING AIRBORNE MOISTURE

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present inventive subject matter relates to methods and systems of harvesting airborne moisture.

2. Description of the Related Art

In climates with little rainfall, pursuits highly dependent on water availability such as agriculture may be limited or impossible. In the worst cases of drought, insufficient water for a population can lead to economic disaster and in some cases a humanitarian crisis as food production becomes impaired and drinking water scarce. In view of these circumstances, technologies have emerged with the goal of fresh water production or reclamation, a particularly low-cost group of technologies being those aimed at the collection of airborne moisture or so-called fog harvesting. One such technology involves erecting large stationary panels of woven fibers such as a polyolefin or stainless steel mesh. When fog contacts the woven mesh, moisture collects or condenses between the fibers migrating mainly by gravity to collection receptacles and is accessed by users or stored for later use. Woven mesh adapted to collect moisture is discussed for example in U.S. Patent Application Pub. No. 2014/01900352, published Jul. 10, 2014 to Park entitled "Liquid Collecting Permeable Structures," also published as U.S. Pat. No. 9,352,258, issued May 31, 2016 ("Park I"), the entire substance and contents of which are wholly incorporated by reference herein. Such systems remain stationary and are most effective when fog or mist travel to the stationary location under the power of wind or other meteorological factors. Because of the sporadic nature of fog, the use of such fog collectors has inherent limitations in terms of efficiency, i.e. the fog collectors are not always actively collecting moisture from fog especially when fog aggregates in low lying areas or areas lacking sufficient air movement. Moreover, at times when moisture collectors are not serving their function, their placement may present a physical and visible obstruction that may adversely affect land use by humans as well movement patterns of local wildlife. Stationary meshes can be a particular hazard to bird populations. In addition, the fog collectors themselves, being always exposed to the elements, are subject to degradation due to weather and solar radiation.

Meanwhile, in an area of technology conventionally unrelated to harvesting airborne moisture, there exist various methods of image-based object recognition. See, for example, U.S. Patent Application Pub. Nos. 2015/0049939 entitled "Metric-Based Recognition, Systems and Methods," 2015/0161474 entitled "Feature Density Object Classification, Systems and Methods" (issued as U.S. Pat. No. 9,466,009), 2015/0254510 entitled "Object Recognition Trait Analysis Systems and Methods," 2015/0261803 entitled "Edge-Based Recognition, Systems and Methods," 2015/0262036 entitled "Global Visual Vocabulary, Systems and Methods," 2015/0278224 entitled "Image Recognition Verification," 2015/0294188 entitled "Invariant-Based Dimensional Reduction of Object Recognition Features, Systems and Methods" (issued as U.S. Pat. No. 9,460,366), 2015/0310306 entitled "Robust Feature Identification for Image-Based Object Recognition" (issued as U.S. Pat. No. 9,558,426), 2015/0324998 (issued as U.S. Pat. No. 9,412,176), 2015/0363644 entitled "Activity Recognition Systems and Methods" (issued as U.S. Pat. No. 9,547,678), 2016/0012597 entitled "Feature Trackability Ranking, Systems and Methods," 2016/0259815 entitled "Large Scale Image Recognition Using Global Signatures and Local Feature Information," 2016/0259816 entitled "Global Signatures for Large-Scale Image Recognition," and 2016/0275353 entitled "Fast Recognition Algorithm Processing, Systems and Methods" (issued as U.S. Pat. No. 9,508,009), the entirety of each of which is wholly incorporated herein by reference. Among such methods are those that make use of edge detection algorithms, e.g. to determine edge-based feature descriptors for a digital image.

BRIEF SUMMARY

The present disclosure contemplates methods and systems of harvesting airborne moisture. In accordance with one embodiment, there is an apparatus for use in harvesting airborne moisture including an unmanned aerial vehicle (UAV) sometimes referred to as a drone, a woven mesh, supported by the UAV, for collecting liquid droplets upon contact with a fog bank, a camera, a processor, a non-transitory, tangible computer readable memory storing software instructions executable by the processor, a fog identification engine executable on the processor according to the software instructions and that is configurable to capture a digital image via the camera, detect an absence of edges or other image recognition features in the digital image, and identify a fog bank as a function of the absence of features in the digital image, and a flight controller, on board the UAV, for directing the UAV to enter a fog bank identified by the fog identification engine.

In accordance with another embodiment, there is an apparatus for use in harvesting airborne moisture including a first unmanned aerial vehicle (UAV), a woven mesh, supported by the first UAV, for collecting liquid droplets upon contact with a fog bank, a second UAV, a camera on board the second UAV, a processor on board the second UAV, a non-transitory, tangible computer readable memory storing software instructions executable by the processor, the memory being on board the second UAV, a fog identification engine executable on the processor according to the software instructions and that is configurable to capture a digital image via the camera, detect an absence of edges or other image recognition features in the digital image, and identify a fog bank as a function of the absence of features in the digital image, and a flight controller, on board the first UAV, for directing the first UAV to enter a fog bank identified by the fog identification engine.

In accordance with yet another embodiment, there is an apparatus for use in harvesting airborne moisture including a camera, a processor, a non-transitory, tangible computer readable memory storing software instructions executable by the processor, a fog identification engine executable on the processor according to the software instructions and that is configurable to capture a digital image via the camera, detect an absence of edges or other image recognition features in the digital image, and identify a fog bank as a function of the absence of features in the digital image, a retractable woven mesh for collecting liquid droplets upon contact with a fog bank, and a controller for directing the retractable woven mesh to enter a fog bank identified by the fog identification engine.

The present inventive subject matter will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 8 is a flow chart illustration of a method discussed herein, with reference to the components of the apparatus shown in FIGS. 1-7;

FIG. 11A shows a retractable woven mesh in an extended state and FIG. 11B shows the retractable woven mesh in a retracted state.

Common reference numerals are used throughout the drawings and the detailed description to indicate the same elements.

DETAILED DESCRIPTION

Figure 1:
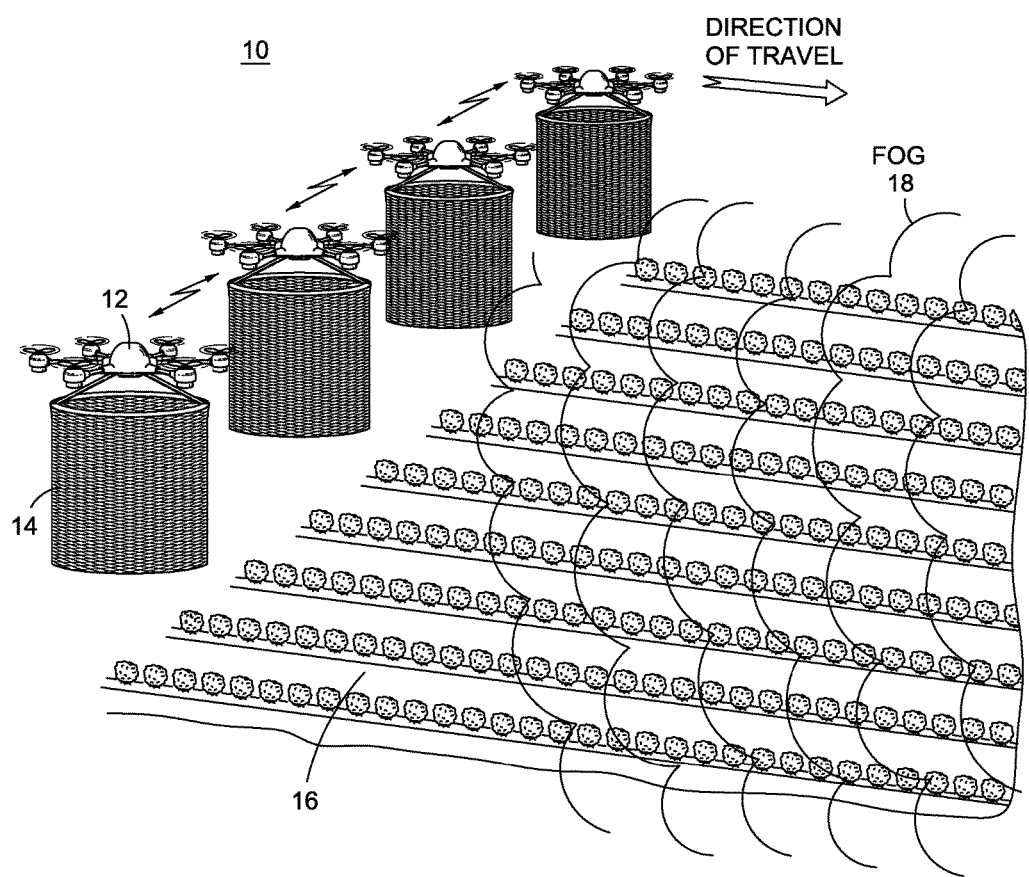
FIG. 1 is a diagram that illustrates an overview of an apparatus for harvesting airborne moisture according to an embodiment of the present inventive subject matter.

The detailed description set forth below in connection with the appended drawings is intended as a description of certain embodiments of an airborne moisture harvesting system and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

It should be noted that the computing devices referred to herein comprise a processor configured to execute software instructions stored on a tangible, non-transitory computer readable storage medium (e.g., hard drive, solid state drive, RAM, flash, ROM, etc.). Further, aspects of the disclosed technologies can be embodied as a computer program product that includes a non-transitory computer readable medium storing the software instructions that causes a processor to execute the disclosed steps associated with implementations of computer-based algorithms, processes, methods, or other instructions. The software instructions preferably configure the computing device to provide a fog identification engine or other functionality as discussed below with respect to the disclosed apparatus. In the various embodiments, the various servers, systems, databases, or interfaces exchange data using standardized protocols or algorithms, possibly based on SMS, MMS, HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document "coupled with" and "coupled to" are also considered to mean "communicatively coupled with" over a network, possibly through one or more intermediary devices.

The disclosed inventive subject matter enables construction or configuration of an apparatus that is operable, either manually or automatically, to respond to the actual occurrence of fog at a given time and place as identified by a fog identification engine that detects an absence of edges or other image recognition features in a digital image. The apparatus permits the localized harvesting in time and place of such identified fog. One should appreciate that the disclosed techniques provide many advantageous technical effects including enhancing water collection efficiency and enhancing the tunability of a water collection system to adapt to varying weather patterns at different times of year or a changing climate. In some embodiments involving water collection by unmanned aerial vehicles (UAV) or drones, the disclosed techniques may further allow access to water for harvesting that is not accessible by conventional methods, such as water in marine layer fog or near sheer rises on the windward sides of mountains, low lying areas with little air movement, as well as delivery of such water to locations removed from the location of capture, such as an agricultural field or an active fire.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

FIG. 1 is a diagram that illustrates an overview of an apparatus 10 for harvesting airborne moisture according to an embodiment of the present inventive subject matter. In the example of FIG. 1, the apparatus 10 includes an unmanned aerial vehicle (UAV) 12, sometimes referred to as a drone, four of which are shown in FIG. 1 operating as a fleet or flock. One should appreciate that any practical number of UAV 12 could be present including 1, 2, 3, 4, 5, 10, 15, 20, 50, 100, or more. The apparatus 10 further includes a woven mesh 14 supported by the UAV 12, for collecting liquid droplets upon contact with a fog bank or in those instances where there is not a visible fog bank, but where atmospheric conditions allow. In the example of FIG. 1, each of the woven mesh structures 14 are supported by a respective UAV 12 in a suspended configuration, but the woven mesh structures 14 may be supported by the UAVs 12 in any sense including being partially or fully integral with the UAVs 12. In connection with the apparatus 10, FIG. 1 further depicts an agricultural field 16 and a fog bank 18 over the agricultural field 16. Double-sided arrows in FIG. 1 indicate signal communication, preferably wireless communication signals (e.g., 802.11, Bluetooth (802.15), Wireless USB, WiGig, ultra wideband, radio, cellular, etc.) between the UAVs 12. As will be described in more detail below, the UAVs 12 may cooperate with each other by signal communication to function as a team, fleet, flock, or network of UAVs 12. The large arrow in FIG. 1 indicates a general direction of travel of the UAVs 12 as the UAVs 12 enter the fog bank 18.

Figure 2:
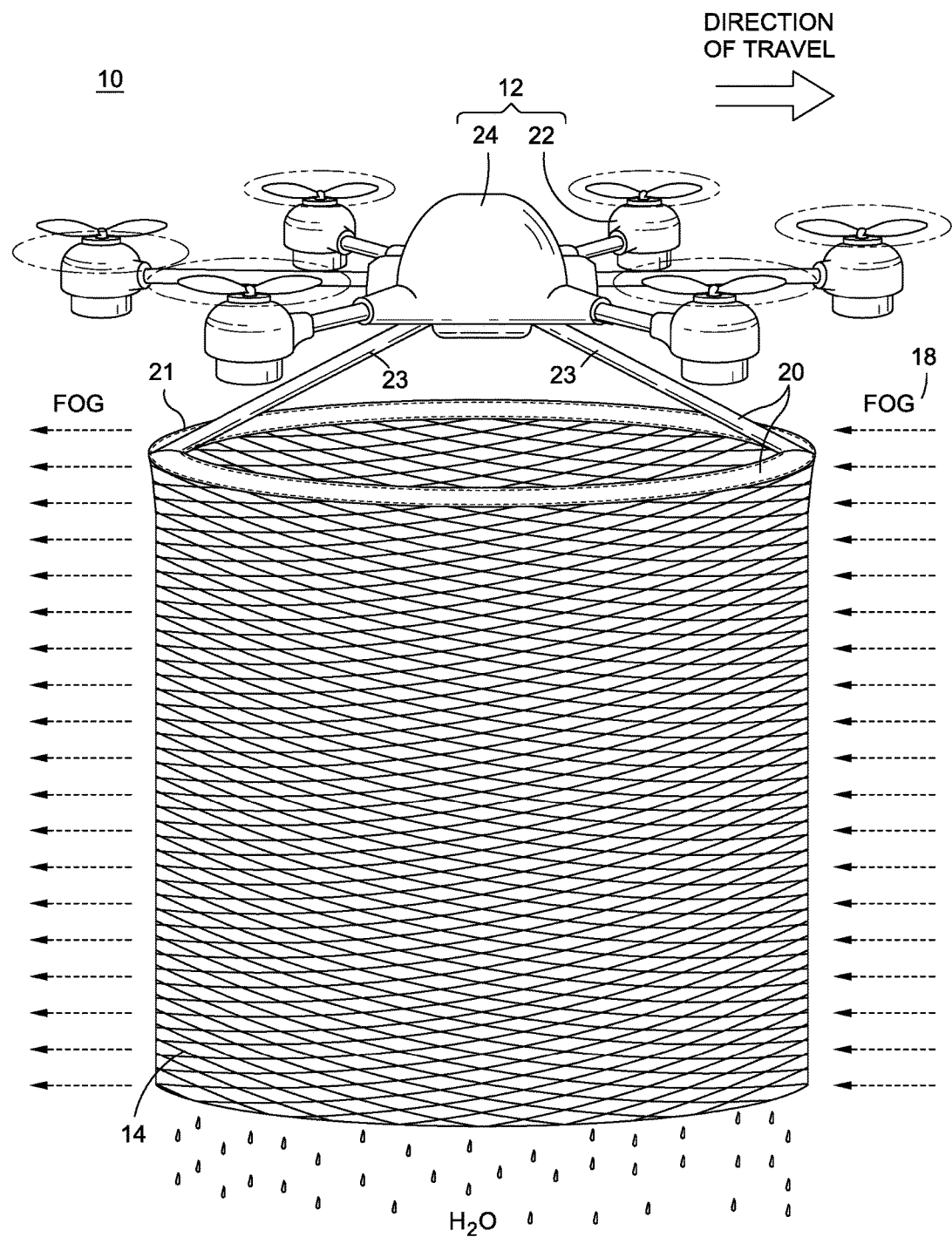
FIG. 2 is a view of the apparatus, including a single UAV and a woven mesh supported by the UAV in a suspended configuration.

FIG. 2 is a view of a single UAV 12 of the apparatus 10 and a woven mesh 14 supported by the UAV 12 in a suspended configuration. The apparatus 10 further includes a support 20 by which the woven mesh 14 is draped or suspended from the UAV 12. In the example of FIG. 2, the support 20 consists of a rigid circular hoop member 21 positioned horizontally relative to the UAV 12 interconnected to the woven mesh 14 to support the mesh 14 to allow the mesh 14 to hang vertically from the hoop member 21 wherein the hoop 21 is interconnected to the UAV 12 by a pair of rigid members 23. In the example shown in FIG. 2, the members 23 extend downwardly from the UAV 12 at an angle to interconnect with the hoop member 21. The support 20 may allow the woven mesh 14 to be suspended vertically from the UAV 12 at an effective distance below the UAV 12.

The specific structure of the support 20 can vary and need not be limited to two members 23 and a circular structure such as the hoop member 21 as shown. It is contemplated that any structure attachable to a UAV 12 and with sufficient rigidity to support the woven mesh 14 may be used in place of the support 20, as may depend on design goals of the particular application. For example, mesh 14 could comprise a planar sheet rather than a circular or cylindrical mesh. Configurations are also envisioned, directly interconnecting the UAV 12 and mesh 14 such as a "sleeve" configuration in which the woven mesh may be 14 wrapped around the body of the UAV 12 or an integral configuration in which the woven mesh 14 itself or a portion thereof could serve as a portion of the UAV 12. It should also be noted that the UAV 12 may support multiple layers of the woven mesh 14, such as concentric layers of decreasing size from an outermost layer to an innermost layer, and as such may include one or more supports to effect such a configuration.

The UAV 12 is depicted as having a hexacopter design with six propeller units 22 surrounding a central control unit 24. The propeller units 22 may include motors and propellers, and the central control unit 24 may include a flight controller, power supply, fuel tank, engines, sensors, and other systems for controlling the operation of the UAV 12. The propeller units 22 and central control unit 24 may be designed and arranged in accordance with well-known multicopter design principles. Other multicopter designs (e.g. quadcopter, octocopter, Y6, etc.) may be used as well, and non-multicopter designs are also contemplated.

As further shown in FIG. 2, the UAV 12, in the example shown, the UAV 12 may move to the right according to the direction of travel indicated by the large arrow so as to enter the fog bank 18, causing fog to cross through the woven mesh 14. The woven mesh 14 may include one or more panels of woven fibers known in the art as being capable of collecting liquid upon contact with fog, such as a polyolefin or stainless steel mesh. For example, the woven mesh 14 may be constructed in accordance with the teachings of Park I, which is incorporated by reference as noted above. As the UAV 12 enters the fog bank 18, water collects or condenses on or between the fibers of the woven mesh 14 and may migrate down the mesh fibers to the bottom of the mesh, and which can thereafter be delivered to an agricultural field, such as field 16 shown in FIG. 1 for purposes of irrigation or other purpose, or to any other delivery location as may be designed. For example, the disclosure contemplates water collection receptacles could be placed at the bottom of the mesh 14. Also, the disclosure contemplates that a release mechanism could open such receptacles at an appointed location, or upon a command from an on board processor, or a command from a radio connected unit to deliver a payload of water to a specific location. It is contemplated that control unit 24 can be specifically configured to monitor energy output with respect to altitude, water weight, wind conditions, or other environmental factors. Thus, control unit 24 can instruct UAV 12 to change behavior when delivering water. For example, in embodiments where UAV 12 collects water in a UAV-mounted receptacle or reservoir, control unit 24 can instruct UAV 12 to deliver it's payload to a ground-based reservoir upon sensing a water level or weight. The water level or weight can be directly sensed via a reservoir sensor (e.g., a float) or possibly through power consumption to maintain a desired altitude. For example, UAV 12 can include a data structure having a table mapping of power consumption to total weight.

Because of frequent contact with fog and resulting wet environment that the UAV 12 operates the UAV 12 may deploy moisture mitigating structures to prevent unwanted moisture damage to the UAV 12. For example the UAV 12 may include structures to assist in making the UAV waterproof or water resistant. In one such structure the UAV 12 may have an outer surface formed of a hydrophobic material. See, e.g. U.S. Pat. No. 7,842,625 entitled "Methods for treating fabric to facilitate moisture transfer from one side to the other," the entirety of which his wholly incorporated by reference herein. Likewise the mesh 14 could deploy arrangements of hydrophobic materials and hydrophilic material to assist in drawing down collected moisture to the bottom of the mesh 14. For example, as moisture collects between the fibers of the mesh 14 assisted by a hydrophilic material on portion, once gravity forces the moisture down the mesh, another portion of the mesh could be formed of a hydrophobic material to assist gravity in directing the water down the mesh to the desired location, either ejecting from the mesh 14 or to collection receptacles (not shown). Likewise geometrical structures within the mesh 14 could also assist in directing collected moisture. For example the mesh 14 could deploy V shaped intersections of material, allowing water to accumulate at the base of the V, and assisting gravity to direct the collected water to a desired location on the mesh 14. Other contemplated embodiments include varying mesh properties based on mesh geometry (e.g., size, shape, height, width, relative distant to UAV 12 parts, etc.). For example, the mesh pitch could vary from top to bottom. The top of the mesh (closest to the UAV 12) might have a finer mesh pitch to better capture moisture from fog 18, possibly from a downdraft of the propellers and might have a course mesh pitch at the bottom to facilitate dripping of the moisture. Example mesh properties that could vary include mesh pitch, mesh arrangements, mesh hole density, hydrophobicity, hydrophilicity, mesh mass density, mesh stiffness, mesh material, or other mesh properties.

FIG. 3 shows a UAV 312 of an apparatus 310, which may be a variation of the example of the apparatus 10 shown in FIGS. 1 and 2. In the example of FIG. 3, the support 320 includes members 323 extending from the UAV 312, to support a circular hoop support 321, having a greater diameter than the hoop support 321 shown in FIG. 2. As shown in FIG. 3, the woven mesh 314 is suspended at a distance from the center of the UAV 312 such that the mesh 314 is suspended from the hoop support 321 beyond the location of the propeller units 322. To this end, the support 320 includes a larger circular support hoop 321 and three equally spaced rigid members 323 (only two visible in FIG. 3) that extend outward from the UAV 312. Because the woven mesh 314 is positioned outwardly beyond the propeller units 322 of the UAV 312, water collection by the woven mesh 314 may be enhanced by the vertical air flow, or downdraft, resulting from the rotation of the propellers. That is, at the same time as the UAV 312 moves through the fog bank 18 causing the moisture of the fog to pass through the woven mesh 314, the action of the propeller units 322 can cause a relative downward motion of the fog and the woven mesh 314, resulting in faster water collection. Water collection may also be promoted by a cooling effect caused by the same arrangement. As air flows through the woven mesh 314 from the propeller units 322, the woven mesh 314 is cooled, thereby enhancing condensation. In some embodiments, UAV 312 can include a mesh cooling unit (not show) that further reduces the relative temperature of the mesh to reduce locally the dew temperature of the fog around the mesh. The mesh cooling unit can include a low weight refrigeration unit, a Peltier cooler, or possibly evaporation caused by down draft of the motors of UAV 312.

It should be recognized that additional ways of enhancing condensation are also possible, such as through the use of an on-board air well or condenser. The particular configuration of a condenser may be selected for low weight and power requirements relative to the needs and requirements of the UAV, as well as considerations of UAV flight speed and condenser drag.

FIG. 4 shows a UAV 412 of an apparatus 410, which may be another variation of the example of the apparatus 10 shown in FIGS. 1 and 2. In the example of FIG. 4, the woven mesh 414 is gathered at the base to form the woven mesh 414 in a conical shape. Shaping the woven mesh 414 in this way helps concentrate collected water in a central position, i.e. at the bottom of the mesh 414, which is useful for delivery of the collected water in various circumstances. For example, at the time of delivery, the tip of the cone could be inserted into a holding tank or other container located on the ground, on a building, or in a vehicle, and a lid or other element of the container could then close on or squeeze the tip to wring out the water collected therein. In some cases, in this and other examples, delivery may comprise a slow drip or artificial rain over a large area such as an agricultural field 16, in which case delivery may be continuous or continuous for some duration of time (e.g. when the UAV 412 flies low enough to ensure that the artificial rain reaches the ground considering humidity and other factors), as the apparatus 410 effectively converts fog to simulated rain. In such cases, the inverted cone shape of the woven mesh 414 may improve the delivery of water for a particular purpose. Consider a scenario where fog is located over a field having cultivated crops growing in tight rows. The inverted cone allows UAV 412 to ensure condensed water is dispersed with more precision on actual crops rather than over a wider area. Thus, the inventive subject matter is considered to include controlling movement of the UAV 412 along specific trajectories that conform to desired water condensation routes, along crop rows for example.

The apparatus 10, 310, 410 may further include a receptacle, attached to the woven mesh 14, 314, 414, in which liquid droplets collected by the woven mesh accumulate. For example, in the examples of FIGS. 2 and 3, in which the woven mesh 14, 314 hangs in the shape of a cylinder, a receptacle may be provided in the form of a circular trough at the bottom of the woven mesh 14, 314. In the example of FIG. 4, in which the woven mesh 414 is shaped like an inverted cone, a receptacle may be provided in any arbitrary form (e.g. a light-weight bucket) underneath or encompassing the tip of the cone. Such receptacle may also include or be operatively coupled to sensor for measuring the amount of obtained water, such as by weight as one example. In some embodiments, the UAV 12, 314, 414 may harvest fog until such an on-board receptacle is full or the amount of water accumulated in the receptacle exceeds a threshold and thereafter deliver the accumulated water as further described below.

FIG. 5 shows an apparatus 510, which may be an example of the apparatus 10, 310, 410 in which the apparatus 510 further includes an onboard camera 526. In the case of FIG. 5, the camera 526 is on board the UAV 512. For example, the camera 526 may be connected to a central control unit 24 (see FIGS. 2-4) of the UAV 512 by a gimbal for stabilization or otherwise supported by (including integral with) the UAV 512. In other examples, to be described in more detail below, a camera 620 may be provided external to the UAV having the woven mesh, e.g. on board a second UAV or part of a stationary hub 730 (see FIG. 7). The camera 512 or other camera may be used to capture a digital image to be used by a fog identification engine 610 to be described in more detail below. As shown schematically in FIG. 5 by the dashed lines coming from the camera 512 and the arrows pointing upward along the extent of the fog bank 18, the camera 512 may capture a series of digital images to allow the fog identification engine 610 to scan or map the fog bank 18 as described below. It should be appreciated that UAV 512 could process such digital imagery locally or could, through a wireless communication channel (e.g., 802.11, radio, etc.), provide the digital imagery to an external server or computing device for processing. For example, a remote image-based object recognition sever can received the digital imagery and execute one or more implementations of image recognition algorithms on the digital imagery. In response to the features detected in the imagery, the server can provide one or more results sets back to UAV 512 (e.g., commands, flight paths, routing, collision avoidance, etc.).

FIG. 6 illustrates a fog identification ecosystem 600 where a computing device of the apparatus 10, 310, 410, 510, etc. (e.g., processor and memory on board UAV 12, at stationary hub 730, etc.), operating as fog identification engine 610, is able to detect a fog bank 18 represented within a digital representation 612 of a scene. Once a fog bank 18 is detected, the apparatus can transmit a signal indicating the fog bank 18 and/or a flight control signal or otherwise direct a UAV 12, 312, 412, 512, etc., retractable woven mesh 72 (described in more detail below with respect to FIGS. 11A and 11B), or other component of the apparatus to enter the fog bank 18 identified by the fog identification engine 610 in order to harvest airborne moisture. One should appreciate that the various roles or responsibilities of the disclosed systems can be distributed among suitably equipped computing device elements of ecosystem 600. For example, in the example shown the various features of the inventive subject matter can be housed within a central control unit 24 of a UAV 12 operating as a component of the apparatus 10. Still, one should appreciate that the fog identification engine 610 could operate as a cloud-based service possibly on a server distal from a UAV or other sensor platform. In such an embodiment, the server can offer its detection services as a Platform-as-a-Service (PaaS), Software-as-a-Service (SaaS), Infrastructure-as-a-Service (IaaS), Recognition-as-a-Service (RaaS), or other types of services, possibly offered as a for-fee service.

From the perspective of the apparatus 10, 310, 410, 510, etc. operating as fog identification engine 610 in the field, the apparatus can, optionally, include at least one camera 620 (e.g. camera 526) configured to obtain digital representation 612 of a scene. More generally, the apparatus can include a variety of sensors, e.g. GPS, cameras, RFID reader, near field radios, microphones, touch screens, accelerometers, magnetometers, gyroscopes, spectrometers, strain or stress gauges, seismometer, galvanometers, Radar, LIDAR, infra red sensor, flow sensor, anemometer, Geiger counter, scintillator, barometer, piezoelectric sensor, or other types of sensors that are advantageous in providing fog identification. In view that such sensors can cover a broad spectrum of data acquisition devices one should appreciate digital representation 612 can comprise a broad spectrum of data modalities and could include one or more of the following types of data: image data, text data, audio data, video data, weather data, or other types of data. The discussion herein presents the inventive subject matter from the perspective of image or video data for clarity purposes only without limiting the scope of the inventive subject matter. One should appreciate that the inventive subject matter is considered to include leveraging the disclosed techniques to detect fog across many different data modalities.

Digital representation 612 can also include multi-dimensional data beyond modalities. For example, in some embodiments, the camera 620 can be configured to acquire 3D video, which could be considered a 4D representation (e.g., 2D images plus depth of field plus time). Example sensors that can provide such information include Primesense® sensors, LeapMotion® or Microsoft® Kinect® sensors. In such scenarios, algorithms 616 can operate on digital representation 612 to derive image features, or rather identify absence of image features possibly including shape, scale, or other higher dimensional information. In some embodiments, the lack of edges in a field of view known to have edges can indicate presence of fog, subject time of data or other environmental factors. The following examples are presented from the perspective of detecting edges. However, it should be appreciated that other image features (e.g., SIFT descriptors, DAISY descriptors, etc.) can also be employed.

Digital representation 612 provides at least two sources of information. First, digital representation 612 can be leveraged by fog identification engine 610 to determine a context in which apparatus 10, 310, 410, 510, etc. finds itself. The context represents a data structure having context attributes derived from digital representation 612. The context could include location information, ambient audio information, weather information, time-of-day information, or other types of attributes. Such context information can be quite useful when determining edge absence detection strategy 614. Second, digital representation 612 also represents the foundational information that directly represents an observed fog bank 18 and from which a fog bank 18 can be specifically identified by detection of absence features 618 via one or more of algorithms 616. The term "absence feature" is used euphemistically to mean members of a result set generated from processing algorithms 616 individually or collectively executed on digital representation 612. For example, executing a Canny edge detection algorithm results in one or more image regions in which no edges are detected. Such image regions may be considered absence features especially in scenarios where, based on a point-of-view of a camera, edges should be present based on known features. As used herein, the terms "edges," "edge absence," "absence of edges," "edge absence feature," etc. may also refer to non-edge features or feature descriptors, e.g. features/descriptors related to texture, etc. Thus, as used throughout this description, detecting an absence of edges also includes detecting an absence of features or feature descriptors generally.

The apparatus 10, 310, 410, 510, etc., configured or programmed as a fog identification engine 610, can identify a fog bank 18 by determining a feature absence detection strategy 614 based on digital representation 612 or other contextual information. Feature absence detection strategy 614 can include one or more algorithm application rules sets that govern how digital representation 612 should be processed by feature detection algorithms 616 in order to detect an absence of edges or other image recognition features in digital representation 612. Example edge detection and edge descriptor techniques are disclosed in U.S. Pat. No. 9,412, 176 titled "Image-Based Feature Detection using Edge Vectors" and U.S. Pat. No. 9,665,606 titled "Edge-Based Recognition, Systems and Methods," both of which are incorporated by reference in their entirety. It should be appreciated that each feature absence detection strategy 614 represents one or more computing modules having software instructions that are stored in a non-transitory computer readable memory. The algorithm application rules sets represent computer commands by which fog identification engine 610 should execute feature detection algorithms 616 on the digital representation 612.

Feature absence detection strategy 614 could comprise an a priori defined set of strategies or strategic packages of code. For example, in some embodiments, the apparatus 10 could be provisioned with numerous, different feature absence detection strategies 614 where each strategy can be selected based on contextual attributes derived from the digital representation 612, perhaps stored as a look-up table. Example strategies might include algorithm application rules sets that comprise prioritized ordering of algorithms 616, cost-based (e.g., time, battery life, etc.) ordering of algorithms 616, parallel processing instructions, applicable algorithms, non-applicable algorithms, or other rules sets. In other embodiments, the feature absence detection strategy 614 could be instantiated by the fog identification engine 610 based on the context attributes derived from the digital representation 612. Consider a scenario where still image data and video data is available, but the video data is noisy. The fog identification engine 610 can employ a strategy where the still image data is processed first over video data because the still image data would be considered as offering more accurate results over the video data.

Each rules set can include pointers or other references to functions, perhaps function pointers, that implement one or more of algorithms 616. Further, each rules set may also have data elements presenting conditions or requirements (e.g., timing, order of execution, starting points, etc.) related to the corresponding algorithms. The conditions can comprise contextual attributes (e.g., location, time, etc.). For example, digital representation 612 could include grayscale data, in which case the fog identification engine 610 could determine that Canny edge detection should be executed before other edge detection algorithms such as tensor voting, Sobel, Prewitt, etc. Further, the device's GPS coordinates within the digital representation 612 or time stamp of the digital representation 612 might indicate that an algorithm suitable for larger fog banks 18 should be performed before other algorithms when the location (e.g. ravine) or time of day data (e.g. early morning) suggests that larger fog banks 18 can be expected. Thus, the construction of the algorithm application rules set can depend on a time, a location, an orientation, a context, a position, a user, a license agreement, a digital representation attribute, a frame rate, a hierarchy, an ontology, or other contextual parameters.

One should appreciate that the spectrum of processing algorithms 616 can also be quite diverse. Further, algorithms can be considered to fall within different classes of algorithms, which can be used to determine feature absence detection strategy 614. Processing algorithms 616 and their corresponding modules process digital representation 612 to generate one or more absence features 618. Fog identification engine 610 executes the processing algorithms 616 according to the algorithm application rules set as determined from feature absence detection strategy 614. As algorithms 616 are executed on digital representation 612, fog identification engine 610 collects absence features 618 from the results. One should appreciate that absence features 618 can include features from many different algorithms, each having a specific data structure or data object format according to the implementation of algorithms 616. Fog identification engine 610 can infer, on the basis of absence features 618, that a fog bank 18 is most likely represented in the digital representation 612. More specifically, the disclosed system can include known features of an environment (e.g., trees, buildings, crops, locations, etc.) forming a model of an expected environment in which a UAV is intended to operate. Such a model can then be used to construct a 3D digital model of the environment. The UAV, or other computing device, can then derive what edges, or other image features, should be present based on the UAV's point of view. If the system detects a decline in feature metrics (e.g., loss in observed number of edges, loss in observed known SIFT descriptors, loss in quality of edges, etc.), then the system can infer that there is an intervening fog bank 18. SIFT descriptors are described in U.S. Pat. No. 6,711,293 titled "Method and Apparatus for Identifying Scale Invariant Features in an Image and Use of Same for Locating an Object in an Image," the entire contents of which is incorporated by reference herein. In this way, the fog identification engine 610 can identify a fog bank 18 as a function of the absence of edges or other image recognition features in the digital image.

In some embodiments feature absence detection strategy 614 can alter the manner in which the fog identification engine 610 infers the existence of a fog bank 18. As fog identification engine 610 obtains contextual information from digital representation 612, perhaps a location or time of data, fog identification engine 610 can instantiate a feature absence detection strategy 614 that adjusts the inference rules for identifying a fog bank 18. For example, location or time of day information could be used to tighten or relax inference rules depending on the likelihood of fog or expected fog thickness, opacity for example. Thus, the inventive subject matter is also considered to include construction of feature absence detection strategies 614 that modify, change, create, or otherwise manage inference rules for identifying a fog bank 18.

One should appreciate that the processes undertaken by the fog identification engine 610 can include generating absence features 618 preferably in substantially real-time with respect to receiving a digital representation 612. In embodiments where the digital representation 612 comprises video data, each frame can be analyzed individually within the time it takes to render the frame. The frame that is analyzed is referred to as a "test image." Each test image could include 10, 100, or more absence features 618. Further, the feature absence detection algorithm application rules set can govern the timing at which an algorithm is executed on a digital representation 612. For example, a first algorithm might be executed on a first test image (i.e., a video frame) of the video, the results of which are used to return a first initial rough estimate of a position of a fog bank 18 in a scene. Moving to the second test image (i.e., a subsequent video frame), the first algorithm is executed on the second test image, while a different algorithm is executed on the first test image in parallel. The results of the different algorithms further refine the results set from the first algorithm. The process can then continue forward frame-by-frame and algorithm-by-algorithm until a convergent or final results set is made. One should appreciate that every frame of the video is not required to be a test image. Rather, a test image could be every other frame, every third frame, every fourth frame, or other frame selected according to a frequency rule set or other algorithm application rules set. Readily available computer vision algorithms can be found in the open source product OpenCV, which can be found at URL www.opencv.org.

Figure 5:
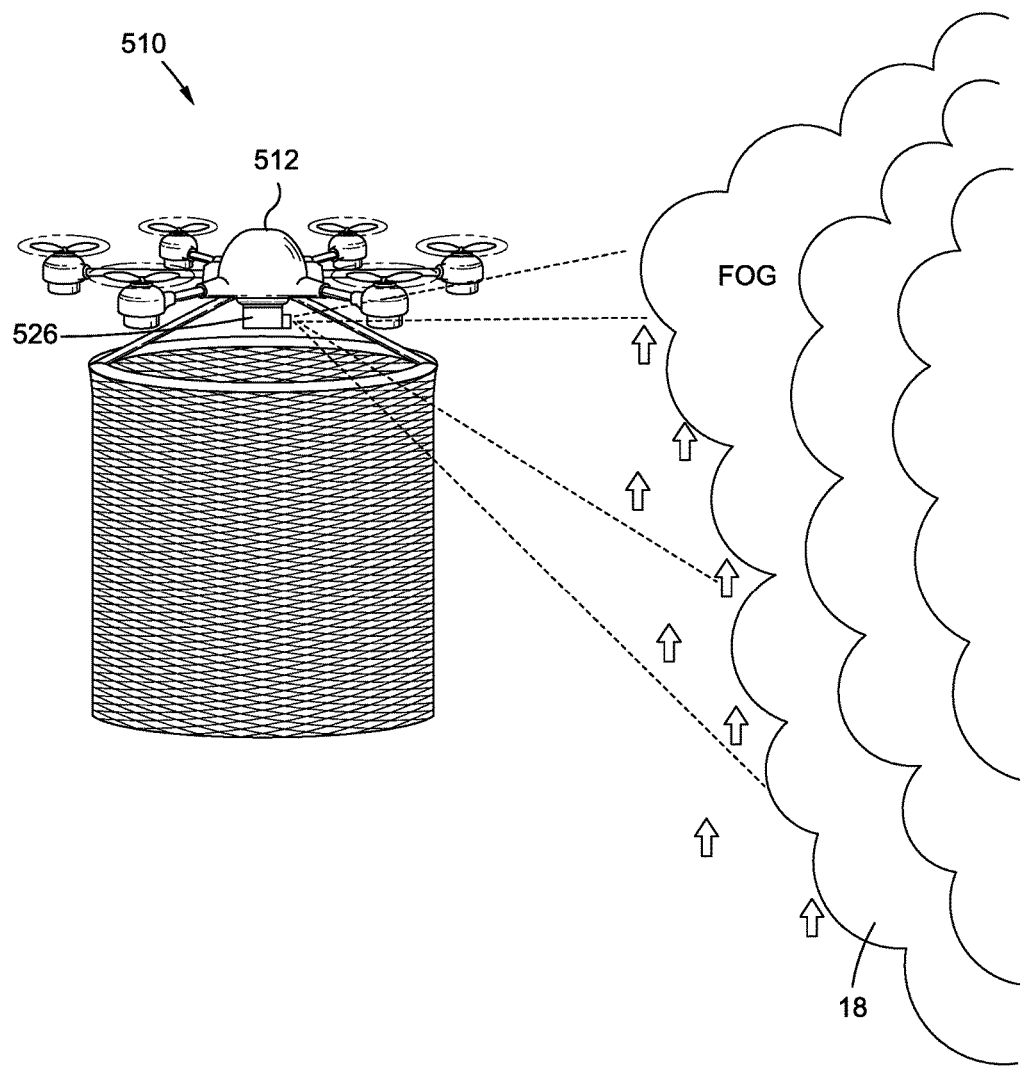
FIG. 5 shows an example of the apparatus in which the apparatus further includes a camera.
Figure 6:
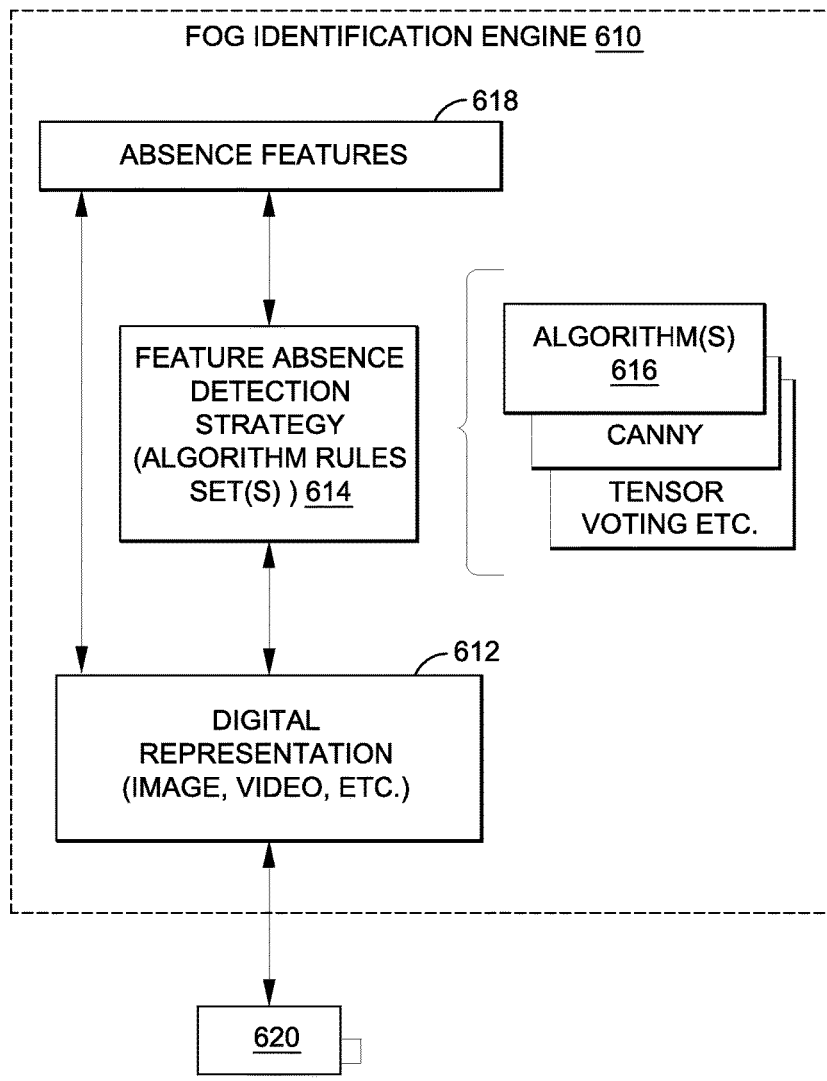
FIG. 6 illustrates a fog identification ecosystem including a computing device of the apparatus operating as a fog identification engine.

As shown in FIG. 6, the fog identification engine 610 interacts with the camera 620 (e.g. camera 526) of the apparatus 10, 300, 400, 500, etc. Namely, upon receipt of a call or other instruction from outside, the fog identification engine 610 captures a digital image via the camera 620, which is then received as a digital representation 612 and thereafter used by the fog identification engine 610 to identify a fog bank 18. In a case where the camera 620 is operable to tilt and pan or otherwise adjust the capture angle or position, the fog identification engine 610 may, in addition to issuing a digital image capture command to the camera 620, further issue a camera adjustment command. As described with respect to FIG. 5, the camera 526 may be connected to a UAV 512 rather than a stationary hub. In an embodiment in which the camera 620 is connected to a UAV, such a camera adjustment command may be issued to a flight controller of the UAV rather than to the camera 620 directly, such that the position of the UAV may be adjusted to effectively adjust the position of the camera 620. Any direct or indirect means of adjusting the position of the camera 620 are intended to be represented schematically by the arrow from the fog identification engine 610 to the camera 620 in FIG. 6.

The fog identification engine 610 detects an absence of edges or other image recognition features in a digital image captured by the digital image capturing section 30 according to a feature absence detection strategy 614. For example, the fog identification engine 610 may detect an absence of edges based on one of tensor voting and a Canny edge detection algorithm. In another example, the fog identification engine 610 may apply one or more methods for edge detection as described in U.S. Patent Application Pub. No. 2015/ 0261803, entitled "Edge-Based Recognition, Systems and Methods," which is incorporated by reference as noted above. In some embodiments, the fog identification engine 610 may eliminate at least one degenerate edge from a plurality of detected edges. Further, in some embodiments, the fog identification engine 610 may scale a captured digital image c by a scaling factor, and the absence of features may be detected within the scaled digital image. For example, the scaling factor may be at least 1.5, or at least 2.0. Although the previous example is presented from the perspective of a visible light image, it should be appreciated that the image sensors could leverage non-visible light including infrared or ultraviolet light. Leveraging multiple parts of the electromagnetic spectrum to detect fog is advantageous because in some parts of the spectrum, the fog will be visible but environment features will not, while in other parts of the spectrum the environment features will still be visible. By comparing and contrasting presence or absence of features in different parts of the spectrum, the UAV, server, hub, or other controller can derive the extent of the fog bank.

The fog identification engine 610 identifies a fog bank, at least in part, as a function of the absence of edges or other image recognition features in a captured digital image. In general, a region of fog is correlated with an absence of features in a digital image. This is because fog obscures features that would otherwise produce edges or other detectable features that would be detected by feature detection algorithms 616. Therefore, the fog identification engine 610 may infer a region of fog from an absence of features in the digital image, e.g. from absence features 618 resulting from a feature absence detection strategy 614. In order to determine the extent of a region of fog inferred in this way, it may be necessary to capture additional digital images near an initial digital image containing a region of fog. For example, a featureless region interpreted as fog may extend to the end of the digital image in one or more directions such that it can be assumed that the fog continues outside the digital image. On the basis of such assumption, the fog identification engine 610 may capture additional images via the camera 620, e.g. adjacent or overlapping images in the one or more directions that the fog appears to continue. In this way, the fog identification engine 610 may continue looping or iterating to capture additional images until the extent of the inferred fog bank 18 is known.

Figure 3:
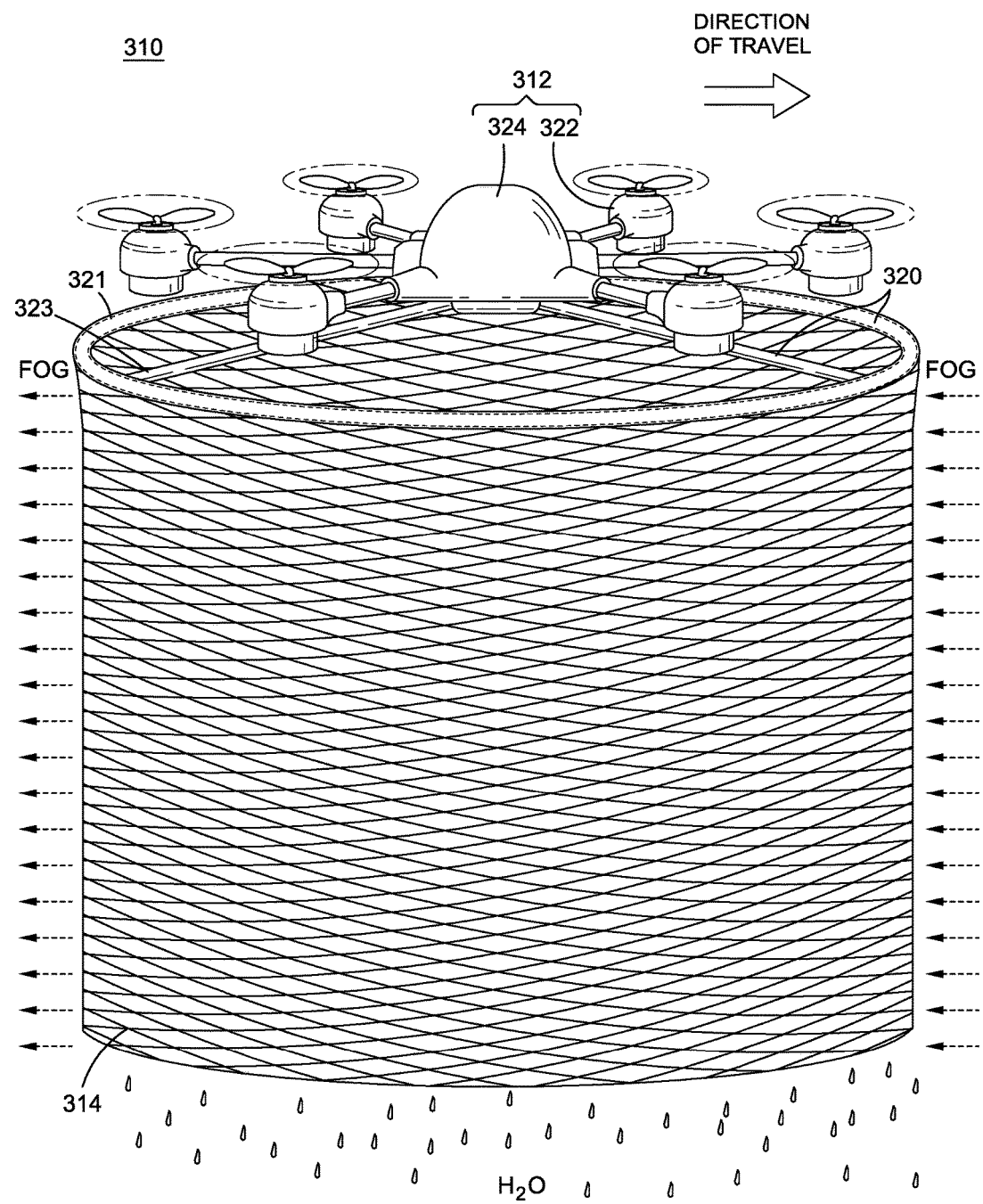
FIG. 3 shows a variation of the example of the apparatus shown in FIG. 2.
Figure 4:
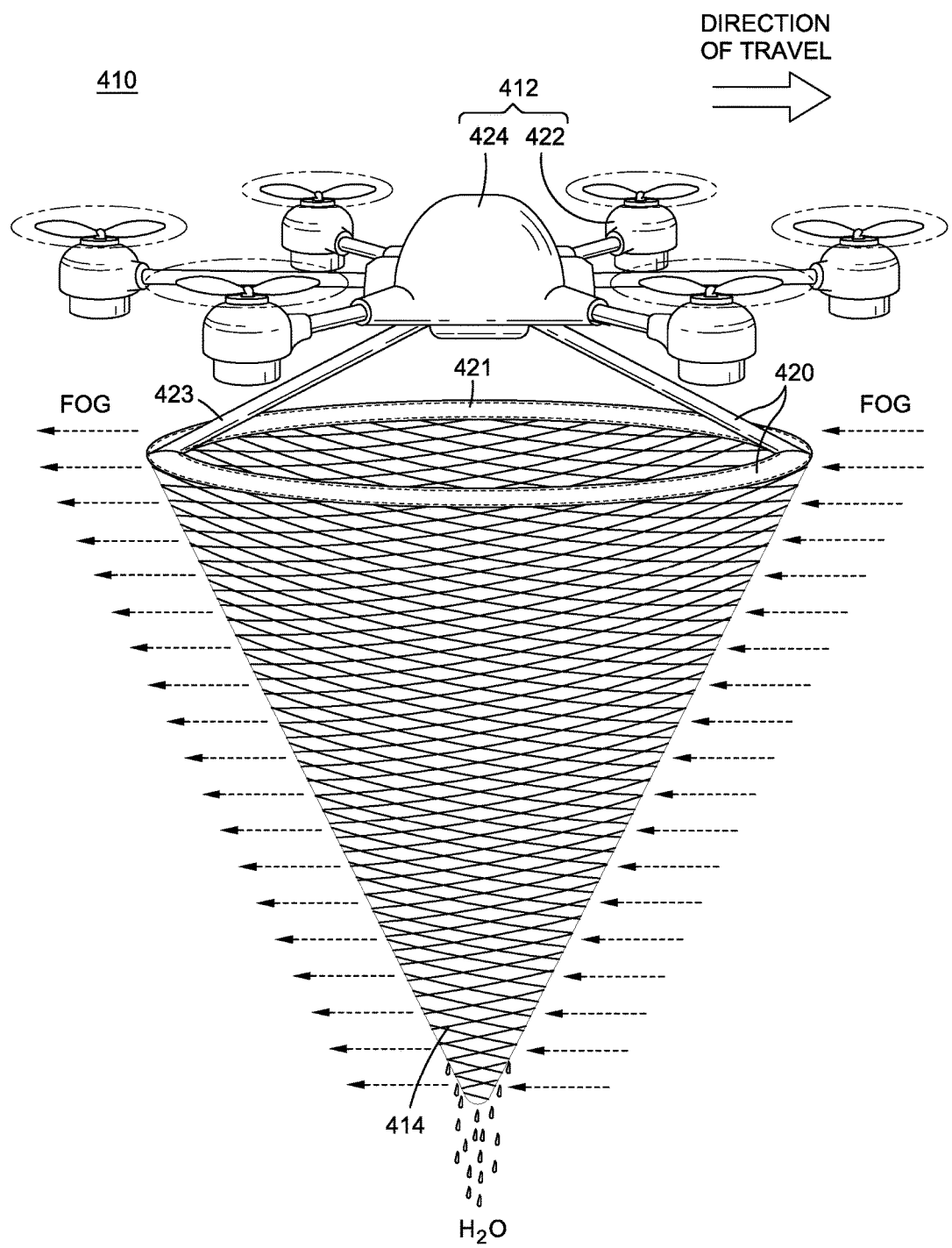
FIG. 4 shows another variation of the example of the apparatus shown in FIG. 2.
Figure 7:
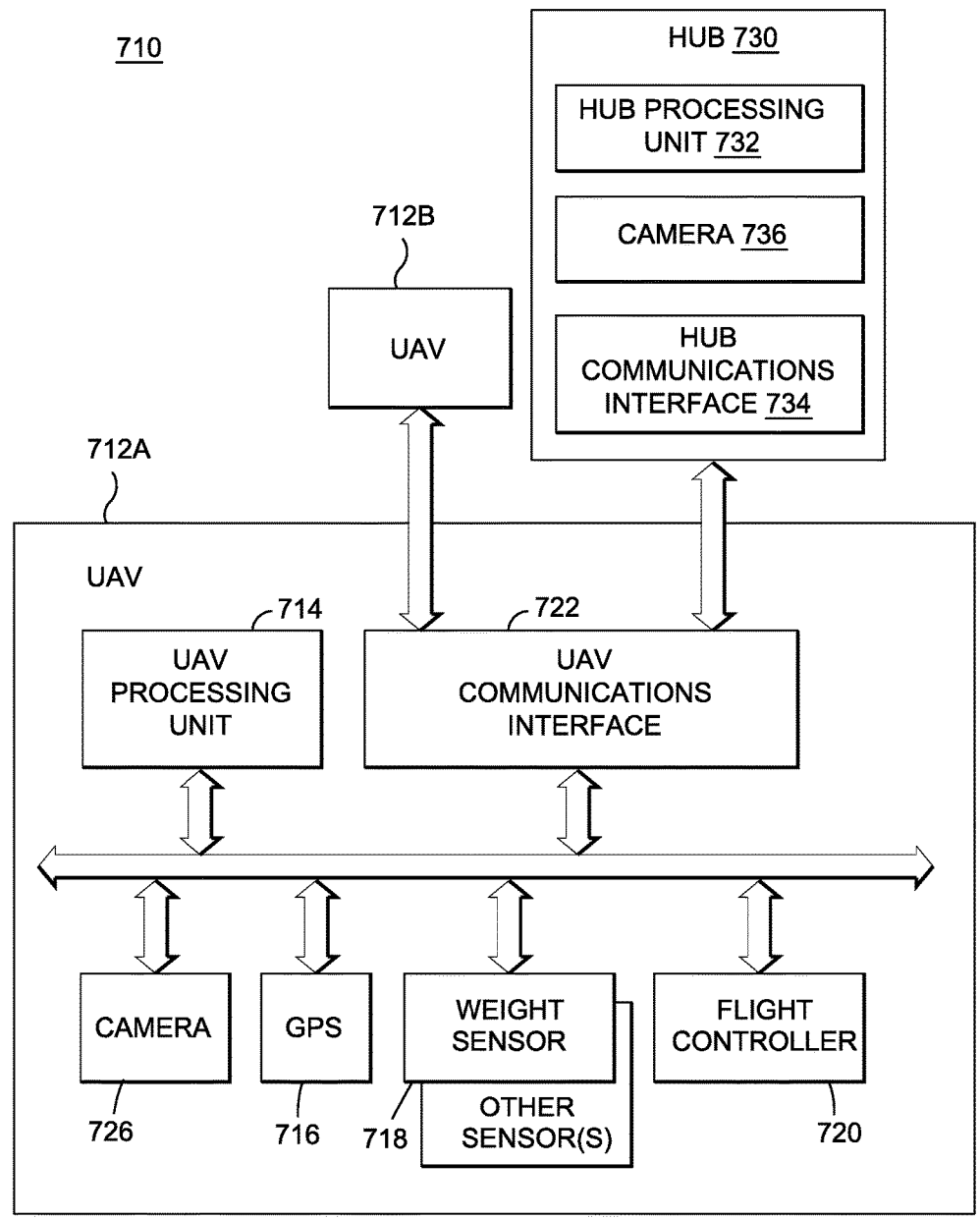
FIG. 7 is a functional block diagram of various systems of a UAV according to an embodiment of the apparatus.

Referring to FIG. 7, there is shown a functional block diagram of various systems of a UAV 712A according to an embodiment of an apparatus 710, which may be an example of the apparatus 10, 310, 410, 510, etc. The UAV 712A shown in FIG. 7 includes a UAV processing unit 714 which may be connected to a camera 726, which may be an example of the camera 620 (see FIG. 5), GPS 716, a weight sensor 718, which may include one or more load cells, and other sensors such as altimeters, accelerometers, gyroscopes, inertial measurement units, compasses, tilt sensors, etc., as well as a flight controller 720, and a UAV communications interface 722, all of which may be included on board the UAV 712A, for example, in a central control unit 24 (see FIGS. 2-4). The UAV processing unit 714 may be responsible for various processing tasks and may, for example, control the overall operation of the UAV 712A. For example, if the UAV processing unit 714 functions as the fog identification engine 610 of FIG. 6, the UAV processing unit 714 may capture a digital image via the camera 620 (e.g. camera 726) to use as the digital representation 612. The features shown in FIG. 7 are not intended to be exhaustive, and the UAV 712A may include various other features not specifically shown, such as a noise abatement system, power supply systems, etc.

The flight controller 720 controls flight of the UAV 712A, for example, by controlling propeller units 22 (see FIGS. 2-4) or other propulsion means in response to commands issued by the UAV processing unit 714. The flight controller 720, in combination with the UAV processing unit 714 and camera 726, may control the flight of the UAV 712A such that known obstacles such as trees and forests are avoided. The UAV 712A may use depth of field sensors such as those offered by PrimeSense to detect distance to objects in order to avoid them and may use a web mapping service such as Google Maps by Google Inc. to navigate the local landscape.

The UAV communications interface 722 (and similarly the hub communications interface 734) may support communication by any conventional communication methods, such as by radio frequency according to cellular network modalities such as GSM (Global System for Mobile communications), CDMA, etc. or local area network modalities such as WiFi (e.g., 802.11), or any other communication means known within the art, for example, infrared, microwave, lasers, and/or ultrasonic communication. As mentioned above, the camera 726 may be on board the UAV 712A along with the UAV processing unit 714, which may function as the fog identification engine 610 (e.g. using a processor and memory of the UAV processing unit 714 on board the UAV 712A). In this case, the UAV 712A may make its own identification of a fog bank 18 that the UAV 712A may then be directed to enter. In a stand-alone configuration of the UAV 712A requiring no external instruction, the UAV processing unit 714 may simply issue a command to the flight controller 720, in response to which the flight controller 720 may direct the UAV 712A to enter the fog bank 18 identified by the fog identification engine 18.

However, even with fog bank identification handled by the UAV 12, it may be advantageous to employ some central or at least external decision-making functionality upon identification of a fog bank 18. For example, the mere identification of a fog bank 18 may not be the only relevant factor in deciding flight directions for the UAV 712A. Other factors may include, for example, the existence of another fog bank 18 of greater priority that is unknown to the UAV 712A, additional information about the same fog bank 18 including aspects of its spatial extent not ascertainable by the UAV 712A, the existence of other UAVs already harvesting fog from the fog bank 18, an overriding command to the UAV 712A or a fleet including the UAV 712A to return to a charging station or other base and cease fog harvesting activity, a relevant weather forecast unknown to the UAV 712A, a physical obstruction unknown to the UAV 712A, etc. In view of such factors, the UAV 712A may, via the UAV communications interface 722, transmit a signal indicating a fog bank identified by the fog identification engine 18 to a stationary hub 730 or a second UAV 712B external to the UAV 712A and receive a flight control signal from the hub 730 or second UAV 712B. The second UAV 712B may be an example of the UAV 12, 312, 412, 512, etc. In response to receipt of the flight control signal, the UAV processing unit 714 may issue a command to the flight controller 720 and the flight controller 720 may direct the UAV 712A accordingly. Thus, the flight controller 720 may direct the UAV 712A to enter a fog bank 18 identified by the fog identification engine 610 in response to receipt of a flight control signal by the UAV communications interface 722.

Instead of or in addition to a camera 726 being on board the UAV 712A, a camera 636 and a processor and memory functioning as the fog identification engine 610 may be part of the stationary hub 730 external to the UAV 712A (e.g. a processor and memory in a hub processing unit 732 of the stationary hub 730). The camera 736 may be an example of the camera 620 of FIG. 6. In this case, the hub 730, a server or deployment truck for example, rather than the UAV 712A may identify a fog bank 18 that the UAV 712A may then be directed to enter. For example, the hub 730 may observe a wide range of local geography from a camera 736 positioned at a high vantage point. On the basis of digital images captured by the camera 727, the hub 730 may identify one or more fog banks 18 that multiple UAVs (e.g. the UAV 712A) may then be directed to enter. The UAV 712A may, via the UAV communications interface 722, receive a flight control signal from the hub 730, e.g. a flight control signal transmitted by a hub communications interface 734 of the hub 730. In response to receipt of the flight control signal, the UAV processing unit 714 may issue a command to the flight controller 720 and the flight controller 720 may direct the UAV 712A accordingly. Thus, in this scenario as well, the flight controller 720 may direct the UAV 712A to enter a fog bank 18 identified by the fog identification engine 610 in response to receipt of a flight control signal by the UAV communications interface 722.

Alternatively, or additionally, instead of being on board a first UAV 712A i.e. the fog harvesting UAV, the camera 726 and a processor and memory functioning as the fog identification engine 610 may be part of a second UAV 712B external to the first UAV 712A (e.g. a processor and memory of a UAV processing unit 714 on board a second UAV 712B). In this case, the second UAV 712B rather than the fog harvesting UAV 712A may identify a fog bank 18 that the first UAV 712A may then be directed to enter. Thus, the second UAV 712B may act as a kind of "shepherd" UAV for the first UAV 712A or for a fleet of UAVs 712A. This may be useful, for example, when visibility of the first UAV 712A is impaired by the fog to be harvested. The second UAV 712B may be substantially identical to the first UAV 712A, though it may omit components related to fog harvesting if it only acts as a shepherd UAV and not a fog harvesting UAV (e.g. in some embodiments connections for a woven mesh 14, 314, 414, etc. and/or a weight sensor 718 may be omitted in the second UAV 712B). For example, the second UAV 712B may have a second UAV communications interface 722, on board the second UAV 712B, for transmitting a flight control signal to the first UAV 712A for directing the first UAV 712A to enter a fog bank identified by the fog identification engine 610. The first UAV 712A may, via a first UAV communications interface 722 of the first UAV 712A, receive such flight control signal from the second UAV 712B. Alternatively, or additionally, the second UAV 712B may have a second UAV communications interface 722, on board the second UAV 712B, for transmitting a signal indicating a fog bank 18 identified by the fog identification engine 610 to a stationary hub 730 external to the first UAV 712A and the second UAV 712B. The first UAV 712A may, via a first UAV communications interface 722 of the first UAV 712A, receive a flight control signal from the hub 730, e.g. a flight control signal transmitted by the hub communications interface 734 of the hub 730. In either case, in response to receipt of the flight control signal, the UAV processing unit 714 of the first UAV 712A may issue a command to the flight controller 720 of the first UAV 712A and the flight controller 720 may direct the first UAV 712A accordingly. Thus, in these scenarios as well, the flight controller 720 of the first UAV 712A may direct the first UAV 712A to enter a fog bank 18 identified by the fog identification engine 610 in response to receipt of a flight control signal by the UAV communications interface 722.

Regarding the use of a fleet of UAVs 12, 312, 412, 512, 712A, 712B, etc., such a fleet could act in coordination as a network (e.g. a mesh network). An example of coordinated flight plans for such a network of UAVs can be found in U.S. Patent Application Pub. No. 2014/0236388 entitled "Aerial Display System with Floating Pixels" (issued as U.S. Pat. No. 8,862,6105), the entirety of which is wholly incorporated by reference herein. In some cases, the apparatus 10, 310, 410, 510, 710, etc. may be arranged as a network including one or more stationary hubs 48 and/or one or more shepherd UAVs (which may, for example, be structurally the same as the other UAVs and only designated as shepherd UAVs on a temporary basis as the geographic or weather situation requires). A hub 730 may act as a control/command center as described above and may also act as UAV battery charging or replacement station, a water delivery site, and/or a site of a human/UAV interface for observation of UAVs, manual control, and/or programming, firmware updates, etc. As a specific example, a fleet of UAVs may be programmed to harvest moisture from marine layer fog at a specific time each morning when fog is expected to be thickest and to thereafter return to a hub 730 for delivery and charging or battery replacement. If backup power is available (e.g. multiple redundant batteries or backup solar power), battery drop-off and pick-up could be achieved in flight. Daily flight paths could be charted using GPS, SLAM, vSLAM, etc. and logged, e.g. for error reporting. Through the use of geofencing, flight path reporting as well as human/UAV interaction including updates and new instructions can be set to occur upon the entering of a UAV in the vicinity of the hub 730 without the need for physical docking.

As another example, a fleet, comprising multiple UAVs 12, 314, 412, 512, 712A or 712B or combinations thereof, may be transported to a moisture collection site on a vehicle (or a plurality of vehicles) such as a truck, boat, blimp or other transport mechanisms capable of carrying a plurality of UAVs. The vehicle can act as the hub 730. As such, moisture collection activity can be directed to distant locations, and the UAVs delivered close to the intended target, without expending fuel or battery power to reach the location. UAVs in communication with each other and/or the vehicle, the may be deployed or leave the vehicle, execute moisture collection in the nearby area as described herein, and return to the vehicle for payload delivery. Also, the vehicle can have docking stations that allow charging of UAVs during transport, or the UAVs can return to the vehicle during the moisture collection activity to recharge, and then re-deploy, as needed. After completing a moisture collection task in one location, the vehicle or vehicles may then move to other locations. In this way, the fleet of UAVs may provide an on-demand service where moisture collection is needed or requested. The use of the vehicle may also reduce the necessary range of the UAVs and/or allow the UAVs to access areas that may otherwise be difficult to access.

As noted above, solar power may be used as a source or supplemental source of UAV power. To this end, the UAV 12, 312, 412, 512, 712A, 712B, etc. may be outfitted with solar panels and may be shaped to accommodate solar panels accordingly.

Referring to FIG. 8, there is shown a flow chart illustration of a method discussed herein, with reference to the components of the apparatus 10, 310, 410, 510, 710, etc. shown in FIGS. 1-7. The steps provided are not required to be completed in sequence. The method begins with the apparatus monitoring the surroundings of a UAV 12, 312, 412, 512, 712A, 712B, etc. in step 810. For example, the apparatus may monitor the surroundings of the UAV using the camera 620, which may be on board the UAV as described above with respect to FIGS. 5 and 7. In other embodiments, as noted above, the camera 620 may be external to the UAV having the woven mesh 14, 314, 414, etc., e.g. on board a second UAV or part of a stationary hub 730. In these cases as well, the apparatus may monitor the surroundings of the UAV using the external camera 620, e.g. from a distance. Monitoring the surroundings of the UAV may include, for example, capturing successive still image frames or video for use as a digital representation 612 by the fog identification engine 610 described with respect to FIG. 6 (e.g. as implemented by the UAV processing unit 714 or hub processing unit 732 described with respect to FIG. 7).

In step 820, the apparatus identifies a fog bank 18. For example, on the basis of the digital representation 612, the fog identification engine 610 described with respect to FIG. 6 may detect absence features 618 using a feature absence detection strategy 614 and infer the existence of a fog bank 18 at some location. In step 830, the UAV may then maneuver to the location of the identified fog bank 18. For example, in response to a command from the UAV processing unit 714, the flight controller 720 may direct the UAV to enter the fog bank 18 identified by the fog identification engine.

As the UAV arrives at and enters the fog bank 18, the woven mesh contacts the fog and begins collecting or condensing liquid droplets. Collection continues as the UAV moves through the fog bank 18. While inside the fog bank 18, visibility (e.g. via the camera 620) may be reduced as determined in step 840 by the UAV processing unit 714. In the event that visibility is determined to be low (e.g. below some threshold), the UAV may utilize non-visual guidance in step 850. For example, the UAV processing unit 714 may activate non-visual guidance systems using a combination of the various sensors of the UAV, such as GPS, sonar, infrared, radar, laser, triangulation, LIDAR, etc. Alternatively, or additionally, upon determining that visibility is low in step 840, the UAV processing unit 714 may activate non-visual guidance 850 using the UAV communications interface 722. For example, a second UAV (such as a shepherd UAV) or stationary hub 730 external to the UAV 12 may be outside of the fog bank 18 and have better visibility. The UAV may receive a flight control signal from such second UAV or stationary hub 730 via the UAV communications interface 722. In response to receipt of the flight control signal, the UAV processing unit 714 may issue a command to the flight controller 720 and the flight controller 720 may direct the UAV accordingly.

In some embodiments, the rate of water collection can be measured by moisture or humidity sensors included in the woven mesh. Such information can be used by the UAV processing unit 714 or hub processing unit 732, for example, to optimize the flight speed of the UAV through the fog bank 18 to enhance water collection. An optimized flight speed or path through a fog bank 18 may be determined using machine learning based on measured characteristics of the fog bank 18 (e.g. dew point) and current flight parameters fed back from the flight controller 720.

As collection of liquid droplets proceeds, the woven mesh becomes heavier due to the weight of the water. The increased weight of the woven mesh (e.g. the increased weight of the UAV supporting the woven mesh) is detected in step 860. For example, the UAV processing unit 714 may detect the increased weight via the weight sensor 718 by comparing the output of the weight sensor 718 to a threshold, possibly a power consumption rate to maintain a specified altitude. Upon detection of an increased weight greater than a threshold, the UAV processing unit 714 issues a command to the flight controller 720 to direct the UAV to deliver the liquid droplets per step 870. In this way, the flight controller 720 may direct the UAV to deliver liquid droplets collected by the woven mesh 14 in response to an output of the weight sensor 718.

Delivery of the liquid droplets in step 870 can take various forms depending on the design goals of the particular application. For example, the flight controller 720 may direct the UAV to move to a delivery location in response to an output of the weight sensor 718. Just as the UAV communications interface 722 may be used to transmit a signal indicating a fog bank 18 identified by the fog bank identification engine 610, the UAV communications interface 722 may also be used to convey the output of the weight sensor 718. For example, the UAV may transmit, via the UAV communications interface 722, a signal indicating an output of the weight sensor 718 to a stationary hub 730 external to the UAV and receive a flight control signal from the hub 730. In this way, the flight controller 720 may direct the UAV to deliver liquid droplets collected by the woven mesh in response to receipt of a flight control signal by the UAV communications interface 722.

The delivery location may be the final destination of the water such as an agricultural field 16 or a designated portion thereof or it may be a holding tank or other container located on the ground, on a building, or in a vehicle. As for the method of delivery, there are various alternatives to the continuous drip of "artificial rain" described above. A simple example is the detachment of the woven mesh from the UAV. Thus, the flight controller 720 may direct the UAV to detach the woven mesh from the UAV 12 in response to an output of the weight sensor 718, instead of or in combination with moving to a delivery location. This may be accomplished, for example, by causing the UAV to fly at an angle or in a pattern that unfastens, unhooks, or otherwise detaches the woven mesh or the support 20, 320, 420, etc. through the use of gravitational or centrifugal force. For example, the support may have an open-sided connector like that of a clothes hanger, which loosely hangs from a connection rod on the UAV. By executing a repeated back-and-forth tilt maneuver, the UAV may cause the connector to swing and fall off the connection rod, thus disconnecting the support and woven mesh from the UAV. Other methods of detachment are also contemplated, such as through the use of a detachment switch controlled by the UAV processing unit 714. As another example, rather than directing the UAV to detach the woven mesh from the UAV, the flight controller 720 may, in response to an output of the weight sensor 718, direct the UAV to execute a delivery maneuver designed to free liquid droplets collected by the woven mesh. For example, similar to how a dog shakes off when it is wet or how a washing machine executes a spin cycle to dry clothes, the UAV may execute a shaking or spinning delivery maneuver, possibly based on random motions, to release the liquid droplets from the woven mesh, after which the woven mesh could be reused without needing to be reattached. More elaborate delivery maneuvers are contemplated as well, such as compressing or twisting the woven mesh to wring out the liquid droplets using dedicated actuators rather than or in addition to the flight controller 720. It is also contemplated, as noted above with respect to the inverted cone embodiment of FIG. 4, that the container, rather than the UAV, may include an element that promotes wringing of the woven mesh or another delivery mechanism (e.g. blowing).

Figure 9:
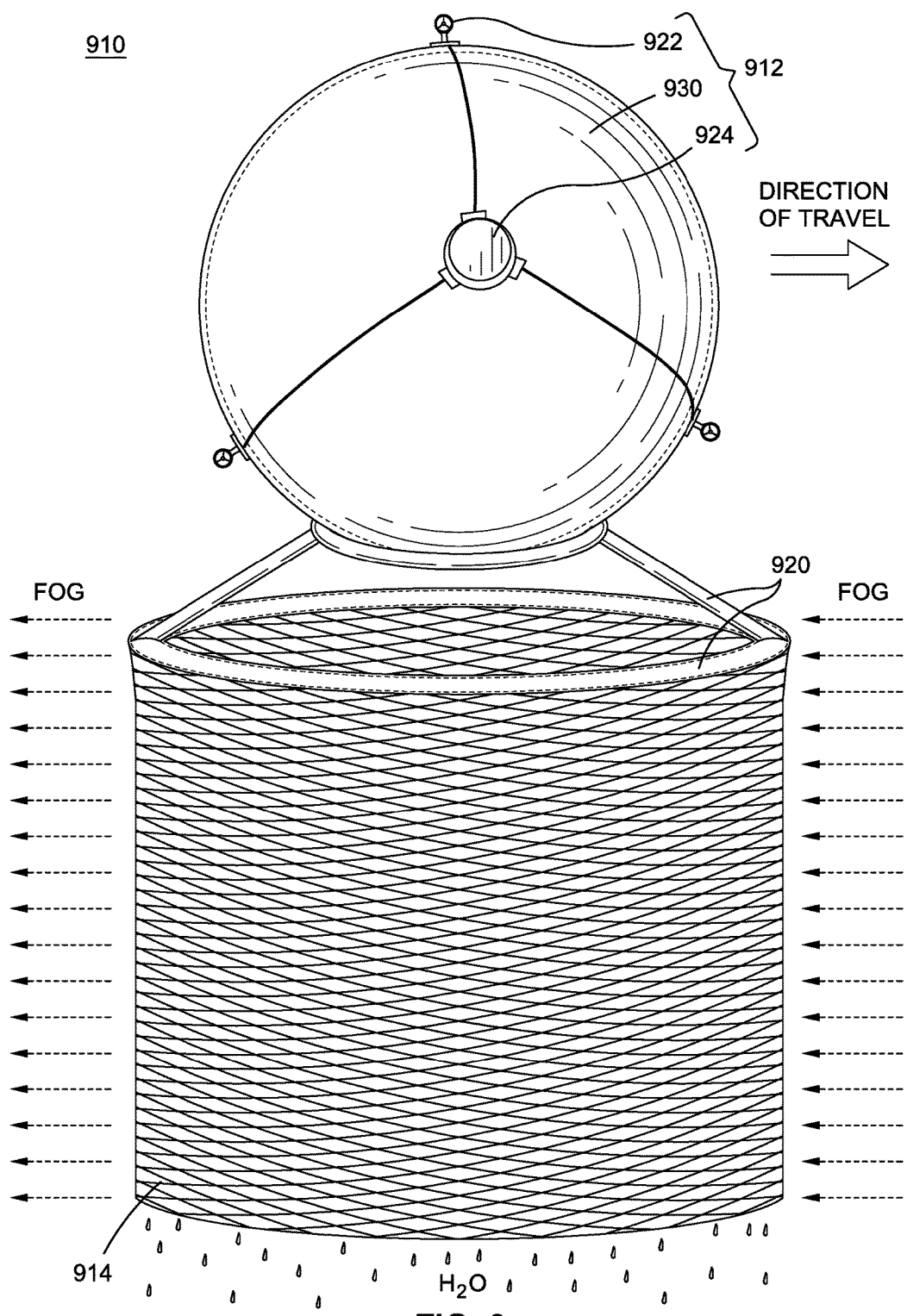
FIG. 9 shows an example of the apparatus, including a single UAV and a woven mesh supported by the UAV in a suspended configuration.

FIG. 9 is a view of an apparatus 910, which may be another example of the apparatus 10 shown in FIGS. 1 and 2, including a single UAV 912 and a woven mesh 914 supported by the UAV 912 in a suspended configuration. FIG. 9 is in operation similar to the UAV 12 of FIG. 2 except for the design of the UAV 12, which, rather than having a multicopter design, has a balloon structure design with three directional propeller units 922, and a central control unit 924 attached to a balloon structure 930. Helium or other gas may provide the uplift and the small propeller units 922 provide directional propulsion. The propeller units 922 may include motors and propellers or ducted fans, and the central control unit 924 may include a flight controller, power supply, sensors, and other systems for controlling the operation of the UAV 912. The number and arrangement of the propeller units 922 on the balloon structure 930, as well as the arrangement of the central control unit 924 and the mechanism for attaching the propeller units 922 and the central control unit 924 to the balloon structure (shown as wire attachments wrapping around balloon structure 930), can be varied depending on well-known UAV design principles. The balloon UAV 912 of FIG. 9 provides the support for the mesh 914, by use of a support structure 920 that interfaces between the UAV 912 and mesh 914. The UAV 912 employs the similar techniques as zero buoyancy UAVs that may be used at sporting events made popular by the company Aerotain of Zurich Switzerland. The lighter than air gas in the balloon provide the lift necessary to raise the mesh 914 and the propeller units 922 operate in cooperative synchronization to provide directional movement of the UAV 912, to operate in a number of modes.

Figure 10:
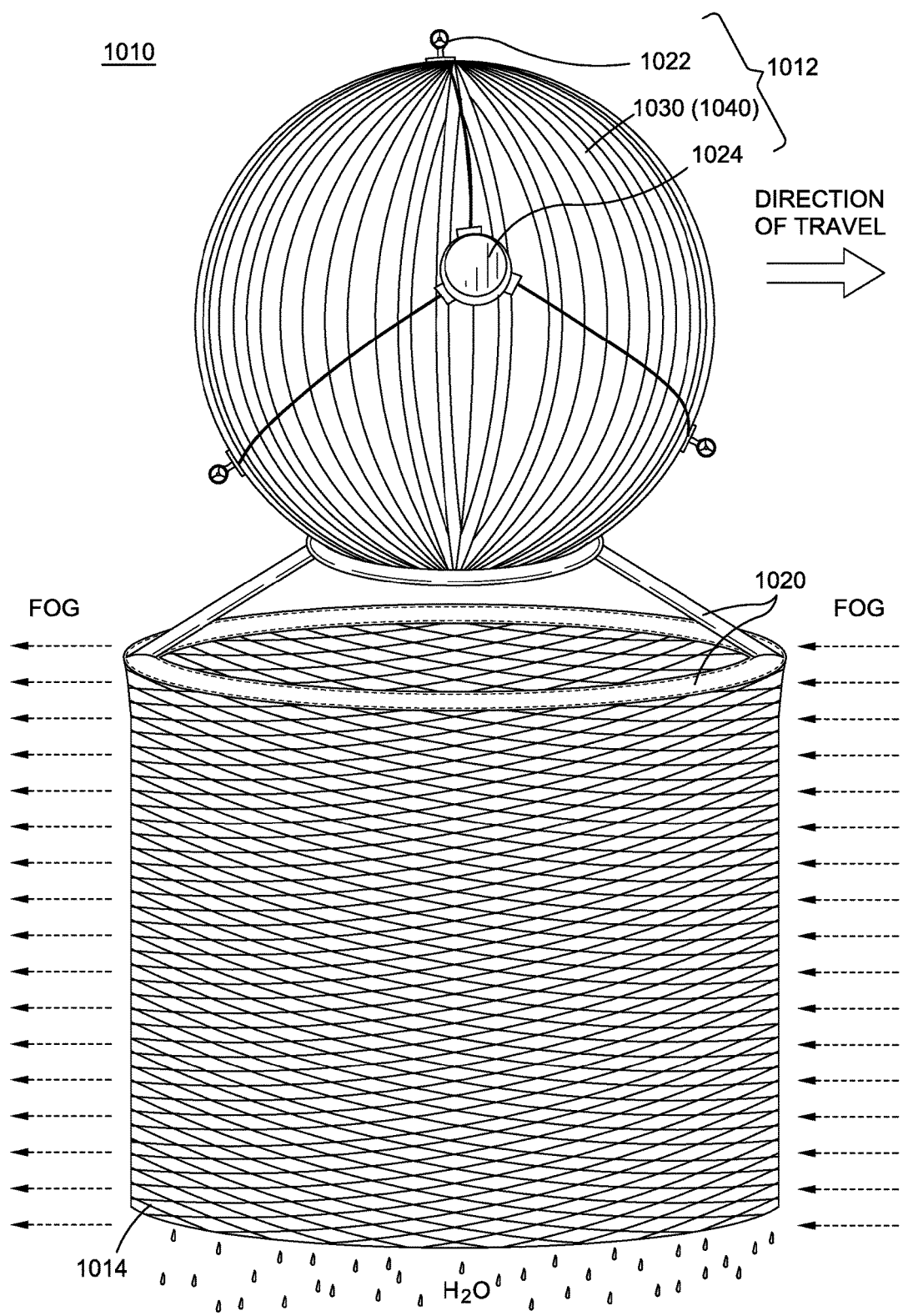
FIG. 10 is a variation of the example of the apparatus shown in FIG. 9.

FIG. 10 is a variation of the example of the apparatus 910 shown in FIG. 9, in which the balloon structure 1030 of the UAV 1012 has a surface including grooves or bumps 70 designed and adapted to promote collection or condensation of liquid droplets as a supplement to the moisture collection mesh 1014. Such grooves, textures, or bumps 1040 may promote the collection of liquid droplets on the surface of the balloon structure 1030 according to natural principles of water collection and techniques used by animals and plants in arid climates. See, e.g. Park, Kyoo-Chul et al., "Condensation on slippery asymmetric bumps," Nature 531, 78-82 (3 Mar. 2016), DOI:10.1038/nature16956 ("Park II"), the entire contents and substance of which is wholly incorporated by reference herein. See also U.S. Pat. No. 3,318,107 issued May 9, 1967 to Riley, et al, entitled "Dew Collecting Method and Apparatus," the entire contents and substance of which is wholly incorporated by reference herein.

Figure 11A:
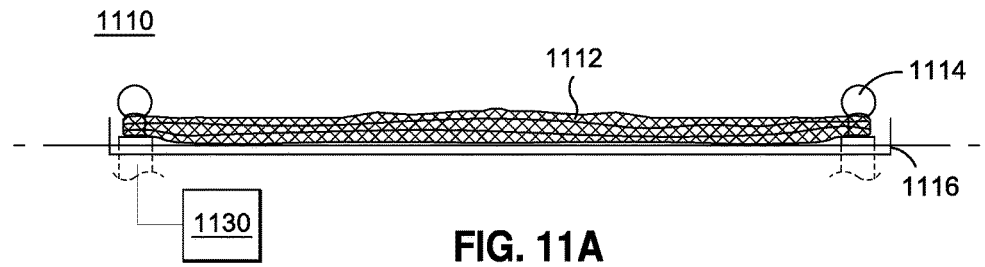
FIGS. 11A and 11B illustrate another example of an apparatus for harvesting airborne moisture according to an embodiment of the present inventive subject matter, where
Figure 11B:
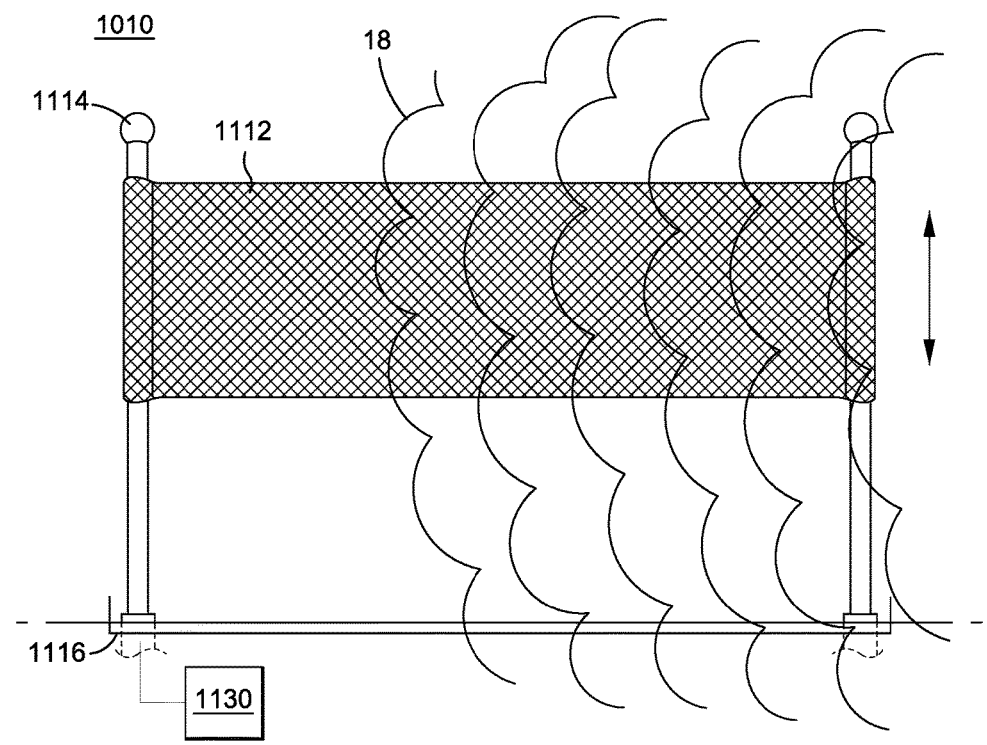

FIGS. 11A and 11B illustrate another example of an apparatus 1110 for harvesting airborne moisture according to an embodiment of the present inventive subject matter. In the example of FIGS. 11A and 11B, the apparatus 1110 includes a retractable woven mesh 1112 for collecting liquid droplets upon contact with a fog bank 18, supported by a mesh support structure 1114 in the form of a pair of retractable poles (though the mesh support structure 1114 may be in any suitable form allowing retraction and extension of the retractable woven mesh 1112). For example the poles 1114 may be hydraulically extended from an underground aperture. In other examples the poles 1114 may comprise include telescoping members that articulate to a first deployed extended position to a second retracted position. The retractable woven mesh 1112 may include one or more panels of woven fibers known in the art as being capable of collecting liquid upon contact with fog, such as a polyolefin or stainless steel mesh. For example, the retractable woven mesh 1112 may be constructed in accordance with the teachings of Park I. As the retractable woven mesh 1112 is deployed into a fog bank 18, water collects between the fibers of the retractable woven mesh 1112, which can thereafter be freed from the retractable woven mesh 1112 and directed to a delivery vessel such as a pipe or allowed to accumulate in a holding tank or other container. FIG. 11A shows the retractable woven mesh 1112 in a retracted state, while FIG. 11B shows the retractable woven mesh 1112 in an extended state with the double-sided arrow indicating the direction of retraction/extension. As shown, the retractable woven mesh 1112 may be substantially planar and may be retractable in a direction parallel to the plane (e.g. up and down in the example shown). It is contemplated that when no fog is available, the mesh 1112 is retracted to lessen exposure to the elements, particularly wind damage. Also, in the retracted position, the apparatus 1110 of FIG. 11A and 11B there is less potential danger to wildlife and certainly less of a visual obstruction.

In the example of FIGS. 11A and 11B, the retracted state of FIG. 11A serves the dual functions of removing the physical and visual obstruction of the retractable woven mesh 1112 from the air and squeezing the retractable woven mesh 1112 to wring out the liquid droplets collected therein. To this end, the apparatus 1110 shown in FIGS. 11A and 11B includes a receptacle 1116, attached to the retractable woven mesh 1112, in which liquid droplets collected by the retractable woven mesh 1112 accumulate. The receptacle 1116 may take the form of a trough as shown in FIGS. 11A and 11B and may connect directly to an output pipe or other delivery vessel for the accumulated water. Such receptacle 1116 may also include or be operatively coupled to sensors for measuring the amount of obtained water.

The apparatus 1110 shown in FIGS. 11A and 11B may be part of or communicatively coupled with a stationary hub 1130, which may be an example of the stationary hub 730 of FIG. 7, which may include a camera 736 (620), a hub processing unit 732, and a hub communications interface 734. By including the retractable woven mesh 1112 and related features for water collection, such an apparatus 1110 may be used for harvesting airborne moisture without any UAVs. For example, a processor and memory of the hub processing unit 732 may embody the fog identification engine 610, which may capture a digital image via the camera 620, detect an absence of edges in the digital image, and identify a fog bank 18 as a function of the absence of edges in the digital image as described above with respect to FIG. 6. The hub processing unit 732 may further act as a controller for directing the retractable woven mesh 1112 to be deployed when a fog bank 18 identified by the fog identification engine 610 over the location of the mesh 1112.

Alternatively, or additionally, the stationary hub 1130 may communicate with a UAV to direct the retractable woven mesh 1112 to be deployed in a fog bank 18. For example, as shown in the example of FIG. 7, a UAV 712A may include a camera 726, a UAV communications interface 722, and a UAV processing unit 714, a processor and memory of which may function as the fog identification engine 610 as described above. Having identified a fog bank using the fog identification engine 610, the UAV 712A may transmit, via the UAV communications interface 722, a signal indicating a fog bank 18 identified by the fog identification engine 610 to the hub 1130. In this way, the hub communications interface 734 may receive the signal from the UAV 712A and the hub processing unit 732 may act as a controller to direct the retractable woven mesh 1112 to enter the fog bank 18 identified by the fog identification engine 610 in response to receipt of the signal by the hub communications interface 734.

Figure 12:
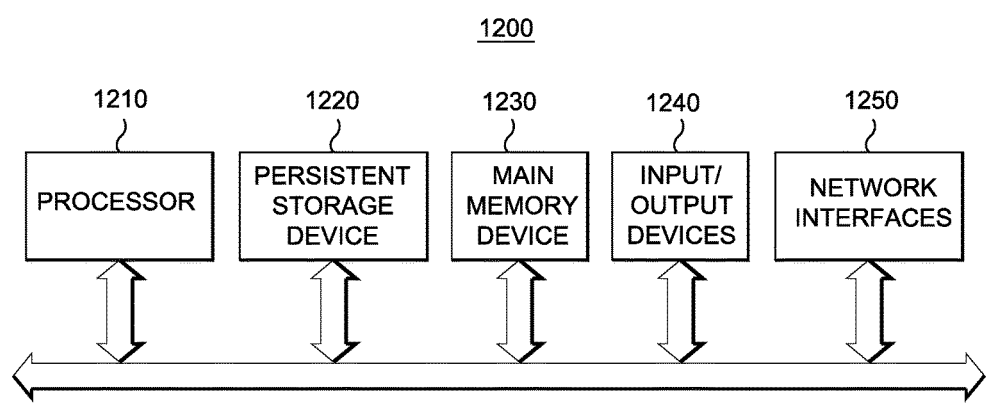
FIG. 12 illustrates a high-level block diagram of an exemplary apparatus that may be used to implement systems, apparatus and methods described herein.

A high-level block diagram of an exemplary apparatus 1200 that may be used to implement systems, apparatus and methods described herein is illustrated in FIG. 12. The apparatus 1200 comprises a processor 1210 operatively coupled to a persistent storage device 1220 and a main memory device 1230. Processor 1210 controls the overall operation of apparatus 1200 by executing computer program instructions that define such operations. The computer program instructions may be stored in persistent storage device 1220, or other computer-readable medium, and loaded into main memory device 1230 when execution of the computer program instructions is desired. For example, the UAV processing unit 714, the hub processing unit 732 and other elements of the UAV 12, 312, 412, 512, 712A, 712B, etc. (e.g. the UAV communications interface 722) may comprise one or more components of the apparatus 1200. Similarly, the hub processing unit 732 and other elements of the hub 730 (e.g. the hub communications interface 734) may comprise one or more components of the apparatus 1200. Thus, the fog identification engine 610 of FIG. 6 as well as the method steps of FIG. 8 can be defined at least in part by the computer program instructions stored in main memory device 1230 and/or persistent storage device 1220 and controlled by processor 1210 executing the computer program instructions. For example, the computer program instructions can be implemented as computer executable code programmed by one skilled in the art to perform an algorithm defined by the fog identification engine 610 of FIG. 6 or the method steps of FIG. 8. Accordingly, by executing the computer program instructions, the processor 1210 executes an algorithm defined by the fog identification engine 610 of FIG. 6 or the method steps of FIG. 8. The apparatus 1200 also includes one or more network interfaces 1250 for communicating with other devices via a network, e.g. via the UAV communications interface 722 or the hub communications interface 734. The apparatus 1200 may also include one or more input/output devices 1240 that enable user interaction with the apparatus 1200 (e.g., display, keyboard, mouse, speakers, buttons, etc.).

Processor 1210 may include both general and special purpose microprocessors, and may be the sole processor or one of multiple processors of apparatus 1200. Processor 1210 may comprise one or more central processing units (CPUs), for example. Processor 1210, persistent storage device 1220, and/or main memory device 1230 may include, be supplemented by, or incorporated in, one or more application-specific integrated circuits (ASICs) and/or one or more field programmable gate arrays (FPGAs).

Persistent storage device 1220 and main memory device 1230 each comprise a tangible non-transitory computer readable storage medium. Persistent storage device 1220, and main memory device 1230, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1240 may include peripherals, such as a printer, scanner, display screen, etc. For example, input/output devices 1240 may include a display device such as a cathode ray tube (CRT), plasma or liquid crystal display (LCD) monitor for displaying information (e.g., an image recognition search result) to a user, a keyboard, and a pointing device such as a mouse or a trackball by which the user can provide input to apparatus 1200.

Any or all of the systems and apparatus discussed herein, including the UAV processing unit 714, hub processing unit 732, and fog identification engine 610, may be performed by, and/or incorporated in, an apparatus such as apparatus 1200.

One skilled in the art will recognize that an implementation of an actual computer or computer system may have other structures and may contain other components as well, and that FIG. 12 is a high level representation of some of the components of such a computer for illustrative purposes.

In the specific examples provided above, a single UAV 12, 312, 412, 512, 712A, 712B etc. supports a given woven mesh 14, 314, 414, etc. However, the disclosure is not intended to be so limited. For example, in some embodiments, a plurality of UAVs may collectively support a single large woven mesh. By adjusting the flight positions of the UAVs, such a mesh can be carried in orientations that promote water drainage to an onboard receptacle or at the time of delivery or to avoid water drainage at instances when retention between the woven fibers is desired (e.g. mid-flight away from delivery site when any onboard receptacle is full).

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. An apparatus for use in harvesting airborne moisture comprising:
   an unmanned aerial vehicle (UAV);
   a woven mesh, supported by the UAV, for collecting liquid droplets upon contact with a fog bank;
   a camera;
   a processor;
   a weight sensor;
   a non-transitory, tangible computer readable memory storing software instructions executable by the processor;
   a fog identification engine executable on the processor according to the software instructions and that is configurable to capture a digital image via the camera, detect an absence of features in the digital image, and identify a fog bank as a function of the absence of features in the digital image; and
   a flight controller, on board the UAV, for directing the UAV to enter a fog bank identified by the fog identification engine and for directing the UAV to deliver collected moisture in response to an output signal of the weight sensor.

2. The apparatus of claim 1 wherein the camera, the processor, and the memory are on board the UAV.

3. The apparatus of claim 2 further comprising:
a communications interface, on board the UAV, for transmitting a signal indicating a fog bank identified by the fog identification engine to a stationary hub external to the UAV and receiving a flight control signal from the hub;
wherein the flight controller directs the UAV to enter a fog bank identified by the fog identification engine in response to receipt of a flight control signal by the communications interface.

4. The apparatus of claim 1 wherein the camera, the processor, and the memory are part of a stationary hub external to the UAV.

5. The apparatus of claim 4 further comprising:
a communications interface, on board the UAV, for receiving a flight control signal from the hub;
wherein the flight controller directs the UAV to enter a fog bank identified by the fog identification engine in response to receipt of a flight control signal by the communications interface.

6. The apparatus of claim 1 further comprising:
a communications interface, on board the UAV, for transmitting a signal indicating an output of the weight sensor to a stationary hub external to the UAV and receiving a flight control signal from the hub;
wherein the flight controller directs the UAV to deliver moisture collected by the woven mesh in response to receipt of a flight control signal by the communications interface.

7. The apparatus of claim 1 wherein the flight controller directs the UAV to move to a delivery location in response to an output of the weight sensor.

8. The apparatus of claim 1 wherein, in response to an output of the weight sensor, the flight controller directs the UAV to execute a delivery maneuver designed to free liquid droplets collected by the woven mesh.

9. The apparatus of claim 1 wherein the flight controller directs the UAV to detach the woven mesh from the UAV in response to an output of the weight sensor.

10. The apparatus of claim 1 wherein the woven mesh is shaped like an inverted cone.

11. The apparatus of claim 1 wherein the UAV comprises a balloon structure.

12. The apparatus of claim 1 wherein the balloon structure has a surface including grooves or bumps designed to promote collection of liquid droplets.

13. An apparatus for use in harvesting airborne moisture comprising:
a first unmanned aerial vehicle (UAV);
a woven mesh, supported by the first UAV, for collecting liquid droplets upon contact with a fog bank;
a weight sensor on board the first UAV;
a second UAV;
a camera on board the second UAV;
a processor on board the second UAV;
a non-transitory, tangible computer readable memory storing software instructions executable by the processor, the memory being on board the second UAV;
a fog identification engine executable on the processor according to the software instructions and that is configurable to capture a digital image via the camera, detect an absence of features in the digital image, and identify a fog bank as a function of the absence of features in the digital image; and
a flight controller, on board the first UAV, for directing the first UAV to enter a fog bank identified by the fog identification engine and for directing the first UAV to deliver collected moisture in response to an output signal of the weight sensor.

14. The apparatus of claim 13 further comprising:
a second UAV communications interface, on board the second UAV, for transmitting a signal indicating a fog bank identified by the fog identification engine to a stationary hub external to the first UAV and the second UAV; and
a first UAV communications interface, on board the first UAV, for receiving a flight control signal from the hub;
wherein the flight controller directs the first UAV to enter a fog bank identified by the fog identification engine in response to receipt of a flight control signal by the first UAV communications interface.

15. The apparatus of claim 13 further comprising:
a second UAV communications interface, on board the second UAV, for transmitting a flight control signal to the first UAV for directing the first UAV to enter a fog bank identified by the fog identification engine; and
a first UAV communications interface, on board the first UAV, for receiving a flight control signal from the second UAV;
wherein the flight controller directs the first UAV to enter a fog bank identified by the fog identification engine in response to receipt of a flight control signal by the first UAV communications interface.

16. An apparatus for use in harvesting airborne moisture comprising:
a camera;
a processor;
a weight sensor;
a non-transitory, tangible computer readable memory storing software instructions executable by the processor;
a fog identification engine executable on the processor according to the software instructions and that is configurable to capture a digital image via the camera, detect an absence of features in the digital image, and identify a fog bank as a function of the absence of features in the digital image;
a retractable woven mesh for collecting liquid droplets upon contact with a fog bank; and
a controller for directing the retractable woven mesh to enter a fog bank identified by the fog identification engine and for directing the retractable woven mesh to deliver collected moisture in response to an output signal of the weight sensor.

17. The apparatus of claim 16, wherein:
the camera, the processor, and the memory are on board an unmanned aerial vehicle (UAV); and
the retractable woven mesh and the controller are part of a stationary hub external to the UAV.

18. The apparatus of claim 17, further comprising:
a UAV communications interface, on board the UAV, for transmitting a signal indicating a fog bank identified by the fog identification engine to the hub; and
a hub communications interface for receiving a signal from the UAV;
wherein the controller directs the retractable woven mesh to enter a fog bank identified by the fog identification engine in response to receipt of a signal by the hub communications interface.

19. The apparatus of claim 16, wherein the retractable woven mesh is substantially planar and is retractable in a direction parallel to the plane.

\* \* \* \* \*